(12) United States Patent
Kanematsu et al.

(10) Patent No.: US 6,791,771 B2
(45) Date of Patent: Sep. 14, 2004

(54) COMPOSITE OPTICAL COMPONENT AND ITS MANUFACTURING METHOD

(75) Inventors: Toshihiro Kanematsu, Tokyo (JP); Hidenobu Kishi, Tokyo (JP); Katsuyuki Ohkubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 148 days.

(21) Appl. No.: 10/050,117

(22) Filed: Jan. 18, 2002

(65) Prior Publication Data

US 2002/0097511 A1 Jul. 25, 2002

(30) Foreign Application Priority Data

Jan. 19, 2001 (JP) .......................................... 2001-011978
Feb. 2, 2001 (JP) .......................................... 2001-026443
Mar. 19, 2001 (JP) .......................................... 2001-077332

(51) Int. Cl.⁷ ............................ G02B 7/02; B23P 25/00
(52) U.S. Cl. ........................ 359/820; 359/813; 359/822; 29/458; 29/527.2
(58) Field of Search ................................. 359/819, 811, 359/818, 813, 820, 822, 619, 621; 29/458, 466, 527.2

(56) References Cited

U.S. PATENT DOCUMENTS

| | | | | |
|---|---|---|---|---|
| 5,249,082 A | * | 9/1993 | Newman | ..................... 359/813 |
| 6,005,723 A | * | 12/1999 | Kosaka et al. | ............... 359/822 |
| 6,363,603 B1 | * | 4/2002 | Nemoto et al. | ................ 29/458 |
| 6,625,864 B2 | * | 9/2003 | Nemoto et al. | ............ 29/527.2 |

* cited by examiner

*Primary Examiner*—Loha Ben
(74) *Attorney, Agent, or Firm*—Oblon, Spivak, McClelland, Maier & Neustadt, P.C.

(57) ABSTRACT

A composite optical component and its manufacturing method are disclosed. A holding member or an optical functional device is subjected to elastic deformation, with both of them fixed together, and the optical functional device is subjected to plastic deformation by heating to reduce stress between two components in such a way that the holding member and optical functional device will be slide-fitted with each other; sliding resistance between the optical functional device and enclosure per "b" in longitudinal direction of the optical component will be $F \leq a/b \times S \times E$; or the optical functional device and holding member will be slide-fit by formation of one integral body in the mold, thereby preventing thermal distortion and distortion of the optical functional device due to recovery of elastic deformation of a reinforcing member, with the result that manufacturing costs can be reduced while a high degree of straightness and high surface precision are maintained.

16 Claims, 20 Drawing Sheets

FIG. 1
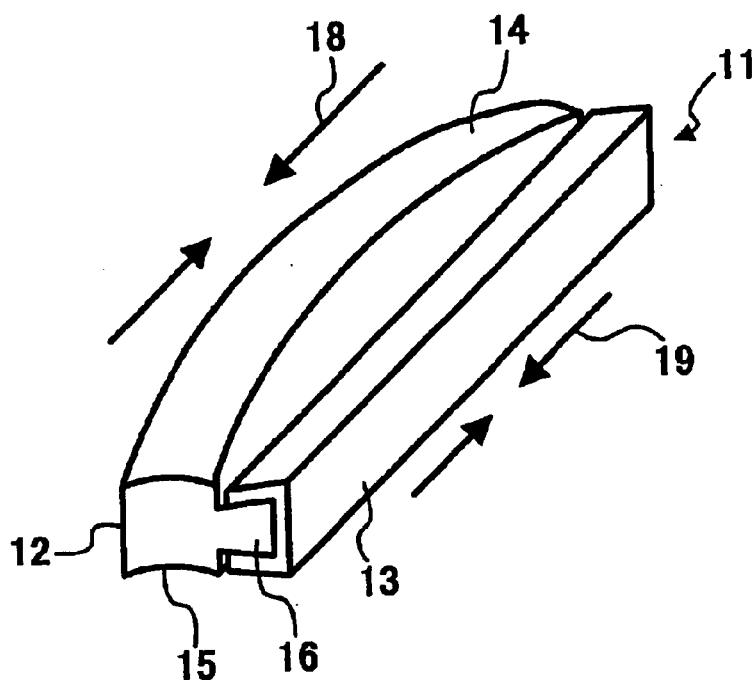
FIG. 2A
FIG. 2B
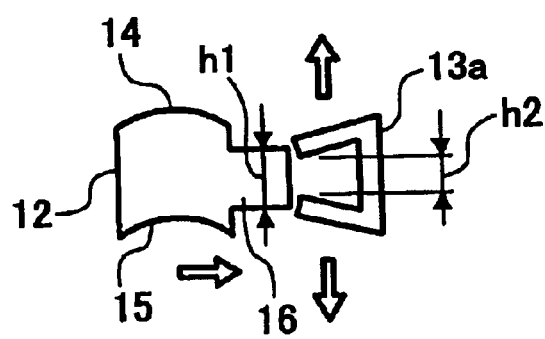
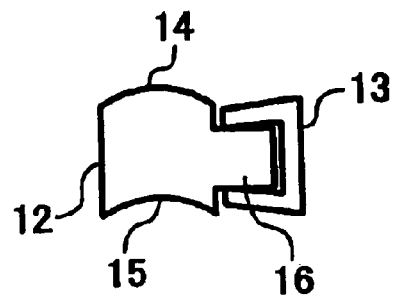

PRESSURIZATION

SECTION VIEW A

CLEARANCE CONTROL

EXAMPLE OF SINGLE LENS

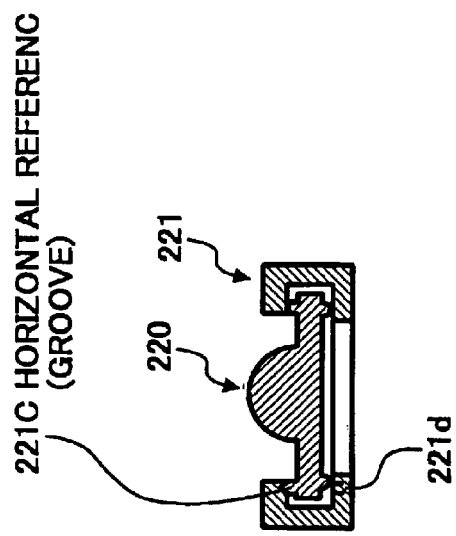
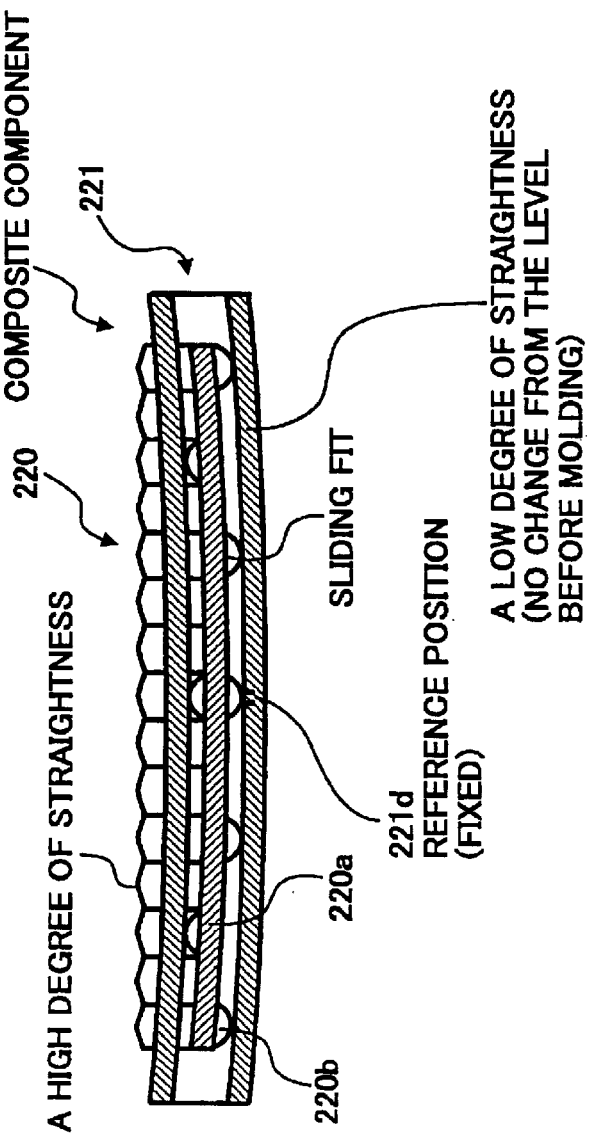

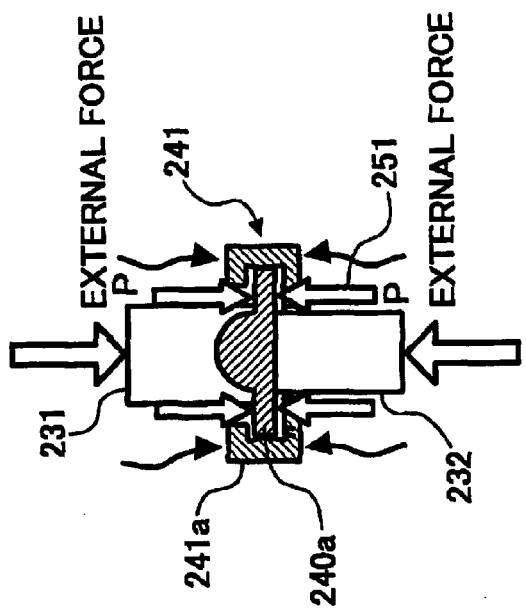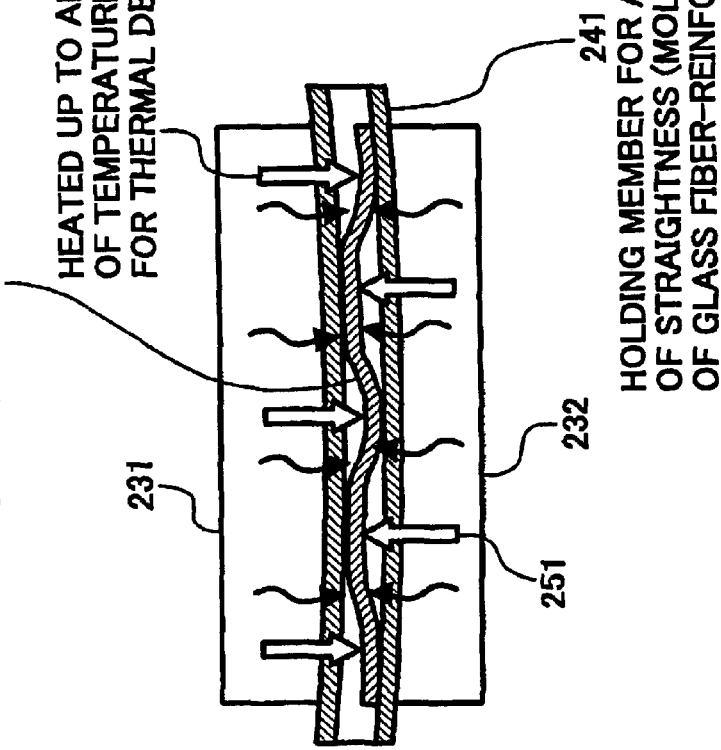

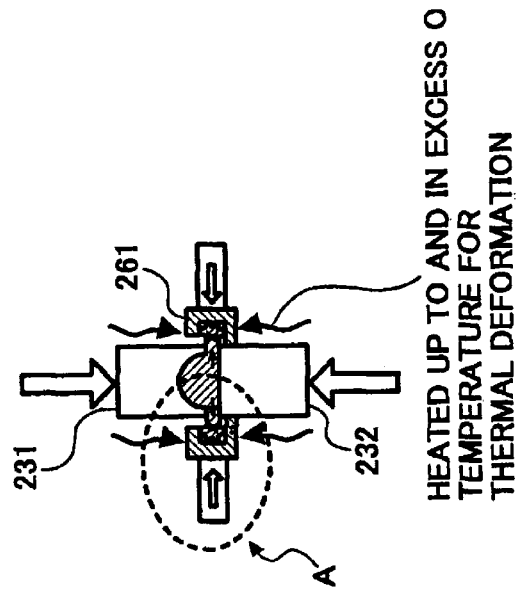
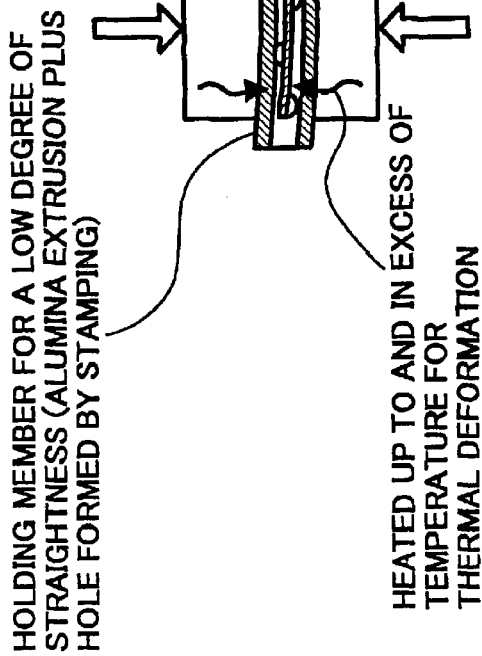
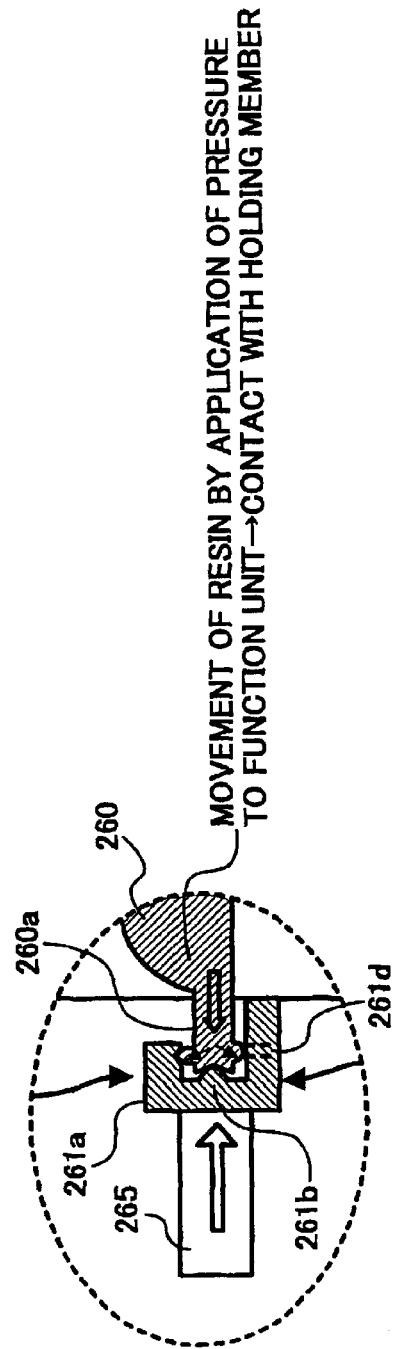

MOLDING MATERIAL
(INJECTION MOLDED PRODUCT HAVING APPROXIMATELY THE FINAL SHAPE)

REFERENCE POSITIONING HOLE

HOLDING MEMBER FOR A LOW DEGREE OF STRAIGHTNESS (SHEET METAL FORMED BY STAMPING)

271d REFERENCE POSITIONING HOLE

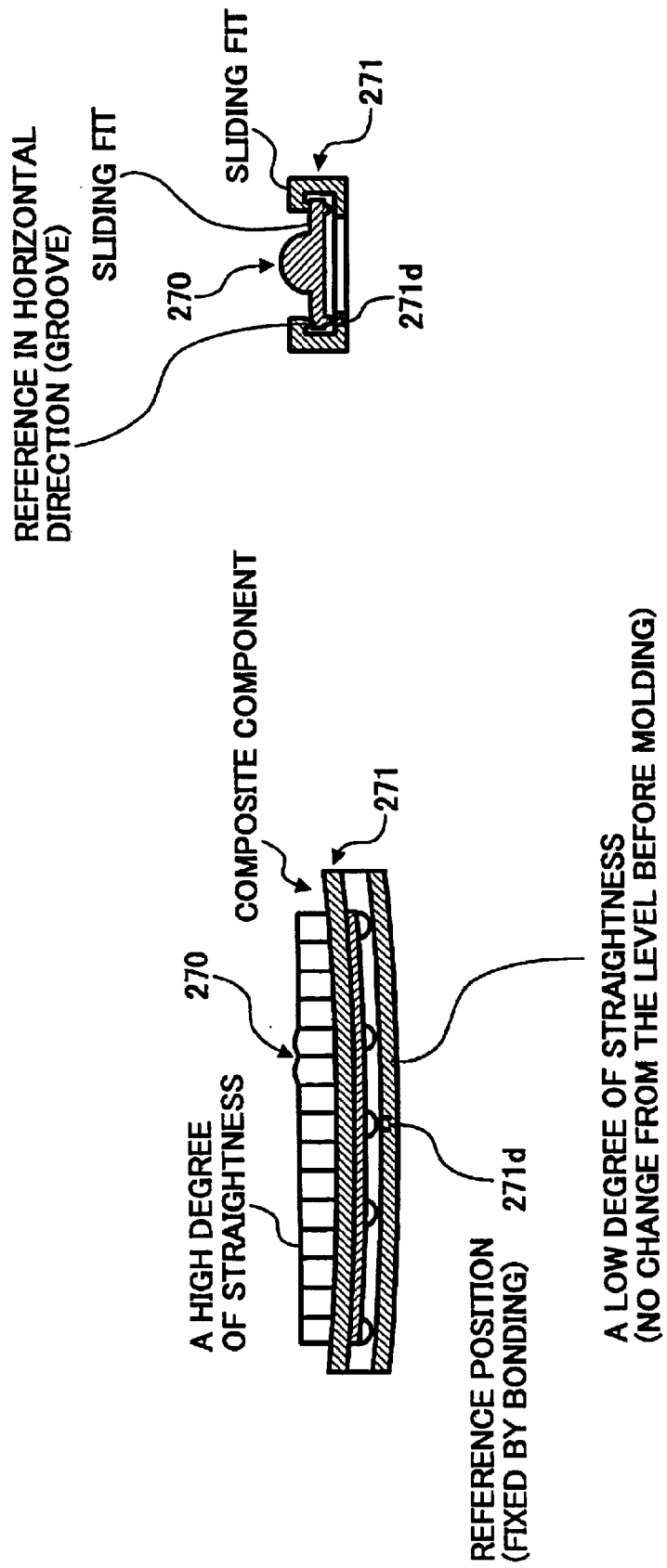

COMPOSITE OPTICAL COMPONENT AND ITS MANUFACTURING METHOD

BACKGROUND OF THE INVENTION

1. Field of the Invention

The present invention relates to a composite optical component formed by combining a functional device with a holding member and a method for manufacturing the composite optical component wherein the aforementioned functional device comprises a high-precision plastic molded product (especially such an optical device as a lens, prism and mirror) used in an optical scanning system such as a copying machine, facsimile machine, solid-stage scanning type printer, image reading apparatus and image writing apparatus.

2. Description of the Prior Art

In recent, one of requirements for such equipment as a copying machine, facsimile machine and optical printer head is to reduce the size (to achieve a smaller space and cost). This is accompanied by an essential requirement for thin-walled configuration of such an optical component as a lens.

An optical component made of plastic material has a smaller material rigidity, so especially a functional device (optical device) for a thin-walled and long-sized lens or the like is subjected to deformation when exposed to a slight load, with the result that straightness deteriorates.

To solve this problem, it is considered that the functional device is formed into a composite optical component using a higher rigid material (hereinafter referred to as "holding member") such as metal.

However, when the aforementioned composite optical component is formed by injection molding ("insert" and "outsert"), the following problems will arise; straightness deteriorated by difference in shrinkage resulting from close adhesion between the two in a cooling step, and changes in straightness due to changing temperatures in the operating environment, because of a great difference in linear expansion coefficients between the functional device and holding member.

To solve this problem, it is considered to effect separation treatment to be provided between the functional device and holding member, but no effective material is found out at present, and no effective method can be expected.

An object of the present invention is to solve the aforementioned issues and to provide a composite optical component and a method for manufacturing it, capable of ensuring the straightness of a functional device in the operating environment (changes in temperature).

SUMMARY OF THE INVENTION (First Invention)

The invention is characterized in that a functional device is sandwiched by a holding member, and a composite body is formed. The present invention has such a configuration provides a simple and effective method wherein, once a composite body is formed, there is only a small change in straightness under loads and in the operating environment (changes in temperature).

The present invention is characterized in that a functional device is caulked by a holding member to form a composite body. The invention arranged in the aforementioned manner provides a simple and effective method wherein, once a composite body is formed; there is only a small change in straightness under loads and in the operating environment (changes in temperature).

The invention is characterized in that a functional device is sandwiched by a holding member, and a composite body is formed through plastic deformation of the functional device. The present invention having such a configuration provides an effective method wherein, once a composite body is formed, there is only a small change in straightness under loads and in the operating environment (changes in temperature). Furthermore, improved engagement between the functional device and holding member is ensured by plastic deformation. Since this engaged portion serves as a guide, superb straightness can be maintained even if misalignment is caused by linear expansion coefficient in the operating environment (changes in temperature).

The invention is characterized in that a functional device is caulked by a holding member, and a composite body is formed through plastic deformation of the functional device. The invention having such a configuration provides an effective method wherein, once a composite body is formed, there is only a small change in straightness under loads and in the operating environment (changes in temperature). Furthermore, improved engagement between the functional device and holding member is ensured by plastic deformation. Since this engaged portion serves as a guide, superb straightness can be maintained even if misalignment is caused by linear expansion coefficient in the operating environment (changes in temperature).

The invention is characterized in that a functional device is press-fitted into a holding member, and a composite body is formed through plastic deformation of the functional device. The invention having such a configuration provides an effective method wherein, once a composite body is formed, there is only a small change in straightness under loads and in the operating environment (changes in temperature). Furthermore, improved engagement between the functional device and holding member is ensured by plastic deformation. Since this engaged portion serves as a guide, superb straightness can be maintained even if misalignment is caused by linear expansion coefficient in the operating environment (changes in temperature).

The invention is characterized in that a holding member or functional device is subjected to elastic deformation and are fixed together. Then the functional device is heated and is subjected to plastic deformation to reduce the stress between two components, thereby allowing the holding member and functional device to slide-fit with each other. According to the invention having such a configuration, the holding member is subjected to elastic deformation first, and is fixed to the functional device. Then the functional device is heated in excess of thermal deformation temperature and is softened, and the installation portion of the functional device is deformed by the resilient restoring force of the holding member. Furthermore, the functional device is solidified by cooling, and a clearance is formed due to the difference in shrinkage of two components, whereby a composite body is formed. Here, the resilient restoring force of the holding member is employed to allow slide-fitting between the functional device and holding member. As a result, direct force is generated between two components, thereby ensuring slide-fitting of excellent engagement. Furthermore, no external force is used. This feature provides a simple configuration and low cost of the apparatus.

The invention is characterized in that a holding member is subjected to elastic deformation to sandwich a functional device. The present invention having such a configuration allows the holding member to sandwich the functional device by subjecting it to elastic deformation.

The invention is characterized in that a holding member is subjected to elastic deformation and a functional device is staked. The invention having such a configuration allows the holding member to be subjected to elastic deformation and the functional device to be caulked.

The invention is characterized in that a functional device is subjected to elastic deformation and is press-fit into a holding member. The invention having such a configuration allows the functional device to be subjected to elastic deformation and to be press-fit into the holding member.

The invention is characterized in that the steps of holding a functional device by a holding member to be formed into a composite body; elastic-deforming the holding member or functional device to fix the holding member and functional device together, heating the functional device, and plastic-deforming to reduce stress between two components, thereby allowing the holding member and functional device to slide-fit with each other, and transfer of the shape of molding die functional surface are carried out in one and the same process. The invention having such a configuration allows the shape of the molding die functional surface to be transferred in one and the same process.

The invention is characterized in that part of a functional device assembled with a holding member is formed in a rugged shape. According to the invention having such a configuration, slide-fitting force (frictional force) can be adjusted in a desired manner by changing the contact area between the functional device and holding member.

The invention is characterized in that part of a functional device assembled with a holding member is designed in a symmetrical configuration. The invention having such a configuration provides a composite optical component with small curvature because temperature distribution is symmetrical during the molding process.

The invention is characterized in that the aforementioned functional device is an optical device wherein one or more lenses, prisms or mirrors are arranged. The invention having such a configuration allows a thin-walled and long-sized optical device to be configured in a composite body most effectively.

(Second Invention)

The invention is characterized in that a composite optical component comprises an optical component and an enclosure of different materials slidably combined with each other to ensure that the sliding resistance between the aforementioned optical component and enclosure will be $F \leq a/b \times S \times E$. Here "S" in the above expression denotes the sectional area of the optical unit of the optical component, "E" shows a longitudinal elastic coefficient of the material of the optical component, and "a" represents a permissible difference of linear expansion (permissible distortion) due to changes of temperature per length b of the optical components with respect to the enclosure. The invention having such a configuration ensures the optical component and enclosure to be firmly held in position without any play at all because the sliding resistance between the aforementioned optical component and enclosure is $F \leq a/b \times S \times E$. This prevents the optical component from being tilted toward the enclosure, deformed or misaligned due to play.

Assuming, on the other hand, that the sectional area of the optical unit of the optical component is S, and the modulus of elasticity of optical component material (longitudinal elastic coefficient) is E, force F which gives distortion of "a" per length "b" of optical component is calculated. Then one gets the aforementioned force $F=a/b \times S \times E$. If the difference in linear expansion (difference in linear expansion per unit length) between the optical component and enclosure due to changes in temperature has reached the level of the aforementioned "a", and the optical component is locked to the enclosure, then only the internal distortion of the optical component reaches the permissible limit in terms of maintaining the optical characteristics due to the aforementioned force F because the enclosure as a reinforcing member is stronger. The optical performance of the optical component is reduced in excess of the permissible limit by this internal distortion. So the optical component must be made to slide with respect to the enclosure to avoid the aforementioned internal distortion due to the difference in thermal expansion. If this difference in expansion is to be removed by sliding, the sliding resistance of the sliding surface must be equal to or lower than the value F. To put it more specifically by giving an example: If the sectional area S of the lens unit =16mm2, the modulus of elasticity of the plastic E=0.25× 1010 [Pa], and a/b=0.001 are substituted into the equation, F=4[N] stands for "Newton" denoting a unit of force) is obtained. The sliding resistance below this value is required.

The lower limit value requiring the aforementioned frictional resistance F is a bonding force necessary to ensure a stable maintenance of the optical component in the enclosure against vibration or the like. This is much smaller than the upper limit value F of the aforementioned sliding resistance. It varies widely according to the type of each composite optical component and the type of the optical equipment where composite optical components are used. Accordingly, the lower limit value of the aforementioned sliding resistance must be determined for each case.

The invention is characterized in that, in a composite optical component comprising an optical component and an enclosure of different materials slidably combined with each other, the optical component and enclosure are fixed at one position, and the sliding resistance of the sliding portions in other areas is kept below $F=a/b \times S \times E$. The invention having such a configuration ensures that misalignment does not occur to the optical component with respect to the enclosure, despite repeated processes of expansion and shrinkage due to changes in temperature, since the optical component and enclosure are fixed at one position. Furthermore, the sliding resistance of the sliding portions in other areas is kept below $F=a/b \times S \times E$. Thus, similarly to the cases of the aforementioned solutions, the difference in thermal expansion between the optical components and enclosure due to changes in temperature is eliminated by the sliding between the optical component and enclosure; therefore, internal distortion does not occur to the optical component due to the aforementioned difference in thermal expansion.

The invention is characterized in that, in a composite optical component comprising an optical component and an enclosure slidably combined with each other, a sliding groove is formed on either of the sliding surfaces between the optical component and enclosure, and a contact protrusion is formed on the other sliding surface. It is fit into the aforementioned sliding groove, and is connected by mechanical contact to permit sliding only in one direction. The invention having such a configuration allows the optical component to slide in a straight line with respect to the enclosure in the direction of the sliding groove (in the longitudinal direction), because a sliding groove is formed on either of the sliding surfaces between the optical component and enclosure, and a contact protrusion is formed on the other sliding surface; furthermore, it is fitted into the aforementioned sliding groove, and is connected by mechanical contact so that it can slide only in one direction. In the direction at a right angle to the sliding groove (lateral direction), the optical component is held by the enclosure by engagement between the contact protrusion and the aforementioned sliding groove, so no misalignment occurs in the lateral direction with respect to the enclosure.

The invention is characterized in that a contact protrusion is formed on either of the sliding surfaces between the optical component and enclosure of the aforementioned composite optical component, and the sliding surface is subjected to mechanical contact due to elastic force caused by elastic deformation of the aforementioned contact protrusion so that sliding resistance occurs. This sliding resistance is kept not to exceed the aforementioned sliding resistance. The invention having such a configuration allows the sliding resistance to be controlled to a specified value with comparative ease by adjusting the height of the contact protrusion, because the sliding resistance of the aforementioned sliding surface is produced by the elastic force caused by deformation of the aforementioned contact protrusion, with the aforementioned optical component fitted into the enclosure.

The invention is characterized in that, in the aforementioned composite optical component, the rib of the optical component is sandwiched and slidably held by the holding part of the enclosure in such a way that the clearance between the aforementioned rib and the aforementioned holding part does not exceed 50 $\mu$m. The invention having such a configuration provides the following advantage: If there is a great clearance between the slide-fitted portions of the rib of the optical component and the holding part of the enclosure, a local tilt or curvature will occur to the optical component, and this will affect optical characteristics. However, if the aforementioned clearance is kept at 50 $\mu$m or less, the aforementioned local tilt and curvature will be kept within the permissible limit. Thus, optical characteristics of the optical component are not affected by the local tilt and curvature.

The invention is characterized in that the aforementioned optical components and enclosure are formed into long-sized tabular members.

The invention is characterized in that the aforementioned optical component is made of resin material, and the enclosure is made of metallic member.

The invention is characterized in that the optical component is made of a glass member or a composite material of resin and glass member.

The invention is characterized in that both the optical component and enclosure are made of resin.

The invention is characterized in that the aforementioned enclosure is made of ceramic material.

The invention is characterized in that the aforementioned optical component is a single optical member in which multiple lenses, prisms and mirrors are arrayed, and the edge of the aforementioned optical component is slidably held by the holding part of the enclosure.

The invention is characterized in that the composite optical component is provided on an optical print head, image forming apparatus or image reading apparatus.

(Third Invention)

The invention is characterized by a composite optical component wherein an optical functional device is held by a holding member for reinforcement, and the aforementioned optical functional device and holding member are processed to become integrated into one body within the mold, and are slide-fitted with each other. In the composite optical component having such a configuration, the optical functional device is firmly held with respect to the holding member without any play, but these two members are not integrally locked by the holding part over the entire length. If the optical functional device is subjected to thermal expansion due to changes in temperature during the use and tends to expand with respect to the holding member, then the optical functional device slides with respect to the holding member against the holding force of the holding part, and the internal distortion of the optical functional device due to thermal expansion is eliminated. Thus, straightness is not deteriorated despite changes in temperature, and high optical performance is ensured.

The holding member is placed outside ("outserted") and is processed into one integrally molded product using a mold. So there is no deterioration of precision due to assembling error, unlike the case where the optical functional device and holding member are molded to a high precision, and are then assembled into a composite body (e.g., the aforementioned art for comparison). Thus, this simple method provides a composite optical component with a high degree of straightness at a low cost.

The invention is characterized by a composite optical component wherein the contact surfaces on the aforementioned slide-fitted portions of the aforementioned optical functional device and holding member are partly fixed with each other, and remaining contact surfaces are slide-fitted. The composite optical component having such a configuration permits the entire optical functional device to move with respect to the holding member and ensures misalignment to be avoided, because the optical functional device and holding member are partly fixed with each other. Further, the optical functional device is fixed at the position serving as a reference with respect to the holding member, so the composite optical component provides a high degree of performance as designed.

The invention is characterized by a composite optical component wherein the contact surfaces on the aforementioned slide-fitted portions of the aforementioned optical functional device and holding member are partly assembled in a rugged shape or fixed with each other by bonding. The composite optical component having such a configuration provides a higher degree of optical characteristics because the reference position of the optical functional device is firmly fixed at a more accurate position with respect to the holding member.

The invention is characterized by a composite optical component wherein a groove is formed on part of the aforementioned holding member or optical functional device, and the protrusion of the optical functional device or holding member is slidably engaged into the aforementioned groove of the holding member or optical functional device in a composite body. The composite optical component having such a configuration provides a high degree of optical performance because sliding is performed only in the permitted direction, independently of the thermal expansion of the optical functional device.

The invention is characterized by a composite optical component wherein the straightness of the contact surface of the holding member slidably in contact with the aforementioned optical functional device is 10 percent or more lower than that required of the optical function unit of the optical functional device. The composite optical component having such a configuration allows use of a low-cost holding member with a low degree of straightness, and is therefore a low-cost and high-function composite optical component.

The invention is characterized by the composite optical component wherein the longitudinal sliding resistance of slide-fitted portions of the aforementioned optical functional device and holding member does not exceed $\Delta F = a \times S \times E$ per 1 mm in the longitudinal direction of the optical functional device, where "a" denotes the permissible elongation of the optical functional device due to thermal expansion in the optical system (the difference in thermal expansion of the holding member and optical functional device per unit length), S represents the sectional area of the function unit of the optical functional device, and E shows a modulus of elasticity (longitudinal elastic coefficient) of the material of the optical functional device. In the composite optical component having such a configuration, the holding member and optical function device are slide-fitted with each other without excessive sliding resistance; therefore, the optical functional device is not subjected to internal distortion due to thermal expansion or the like. Accordingly, excellent straightness of the optical functional device is not deteriorated by thermal expansion or the like.

The invention is characterized by a composite optical component wherein the portion of the aforementioned optical functional device in contact with the holding member is composed of a resin material. The composite optical component having such a configuration is made of the resin material characterized by excellent mold-ability, so it has a slide-fitted surface easily molded. It is a composite optical component characterized by tow cost and excellent functions The invention is characterized by a composite optical component wherein the aforementioned holding member is made of metallic material. The composite optical component having such a configuration provides a high-strength composite optical component because it uses a holding member made of a metallic material much stronger than resin. Accordingly, even under the circumstances where deflection is given to the composite optical component the aforementioned composite optical component maintains excellent optical characteristics.

The invention is characterized by a composite optical component wherein the aforementioned holding member is obtained by stamping the product molded by aluminum-extrusion or extrusion. The composite optical component having such a configuration is characterized by light weight, processing ease and low cost because the product molded by aluminum-extrusion is used as a holding member.

The invention is characterized by a composite optical component wherein the aforementioned holding member is made of stamped sheet metal. The composite optical component having such a configuration is a high-strength and low-cost composite optical component because the holding member is made of stamped sheet metal characterized by excellent processability.

The invention is characterized by a composite optical component wherein the aforementioned holding member is made of resin material reinforced with glass fiber. The composite optical component having such a configuration is a low-cost and high-function composite optical component because the holding member is made of resin material reinforced with glass fiber characterized by excellent mass production.

The invention is characterized by a composite optical component wherein the function unit of the aforementioned optical functional device is made of resin material. The composite optical component having such a configuration is characterized by easy mold-ability of optical functional surfaces and high-precision optical functional surfaces because the holding member is made of resin material characterized by excellent moldability.

The invention is characterized by a method for manufacturing a composite optical component wherein the aforementioned optical function device and holding member are processed into one integral body by a mold. It is further characterized by a method for manufacturing the composite optical component wherein transfer of the optical function surface of the molding die for the aforementioned optical functional device and slide-fitting between the optical functional device and holding member are provided in one and same molding step. The method for manufacturing the composite optical component having such a configuration provides a composite optical component of high straightness at a low cost, as compared to the case where the holding member and optical functional device are separately processed and are assembled into one piece.

The invention is characterized by a method for manufacturing a composite optical component wherein transfer of the optical function surface of the molding die for the aforementioned optical functional device and slide-fitting between the optical functional device and holding member are provided in one and same molding step using different mechanisms. The manufacturing method configured in this manner provides slide-fitting surfaces having a predetermined fixing force with regard to the slide-fitted portions between the holding member and optical functional device. It provides a composite optical functional device of high precision and high straightness at a low cost.

The invention is characterized by a method for manufacturing a composite optical component wherein the optical function surface of the molding die is transferred to a spare molded product of the optical functional device after the aforementioned spare molded product is inserted into the aforementioned holding member. The manufacturing method configured in this manner considerably reduces the time of molding the composite optical component having a high-precision optical function surface using the optical functional device.

The invention is characterized by a method for manufacturing a composite optical component wherein the aforementioned spare molded product is made of resin material, and the optical functional surface of the molding die is transferred by moving the molding die having the shape of optical functional surface, and applying pressure to the optical functional surface of the aforementioned spare molded product. The manufacturing method configured in this manner provides a reliable way of forming a high-precision optical functional surface of the optical functional device, and a high-precision and low-cost composite optical component.

The invention is characterized by a method for manufacturing a composite optical component wherein pressure is applied to the functional surface-compatible portion of the aforementioned spare molded product and the vicinity thereof, after having been heated in excess of the glass transition point of the resin material being used. The manufacturing method configured in this manner provides a reliable way for stable formation of a higher-precision optical functional surface, and provides a high-precision and low-cost composite optical component.

The invention is characterized by a method for manufacturing a composite optical component wherein the shape of the aforementioned spare molded product is close to the final shape of the optical functional device. The manufacturing method configured in this manner allows short-time molding of a molded product with high-precision optical functional surface, and provides a low-cost and high-precision composite optical component.

The invention is characterized by a method for manufacturing a composite optical component wherein the aforementioned spare molded product is an injection molded product. The manufacturing method configured in this manner allows low-cost volume production of a spare molding component having a shape close to the final one, and hence permits a low-cost and high-precision composite optical component to be manufactured.

The invention is characterized by a method for manufacturing a composite optical component wherein heat and pressure are applied to several positions in the vicinity of the contact surface of the aforementioned optical functional device in contact with the aforementioned holding member to make wave-shaped deformation, thereby ensuring slide-fitting between the aforementioned optical functional device and holding part of the aforementioned holding member. The manufacturing method configured in this manner allows easy formation of slide-fitted portions between the optical functional device and the holding member having a predetermined fixing force, and hence permits easy production of a low-cost and high-precision composite optical component.

The invention is characterized by a method for manufacturing a composite optical component wherein external force is applied to the vicinity of the contact surface of the aforementioned optical functional device in contact with the holding member to ensure that the optical functional device is slide-fitted to the holding part of the holding member. The manufacturing method configured in this manner allows easy formation of slide-fitted portions between the optical functional device and the holding member having a predetermined fixing force, and hence permits easy production of a high-precision and low-cost composite component.

The invention is characterized by a method for manufacturing a composite optical component wherein external force is applied to the vicinity of the contact surface of the aforementioned holding member in contact with the optical functional device to ensure that the optical functional device is slide-fitted to the holding part of the holding member. The manufacturing method configured in this manner provides a reliable way of deforming the resin to form a slide-fitting part between the optical functional device and holding member, and allows a high-precision and low-cost composite optical component to be manufactured.

The invention is characterized by a method for manufacturing a composite optical component wherein the resin moved by application of pressure to the functional surface of the aforementioned optical functional device or application of the aforementioned external force to other positions than the functional surface is brought into mechanical contact with the internal side surface of the holding member in such a way that the optical functional device is slide-fitted to the holding part of the holding member. The manufacturing method configured in this manner provides a reliable way of forming slide-fitted portions of a greater contact surface area between the optical functional device and holding member, and hence allows a high-precision and low-cost composite optical component to be manufactured.

The invention is characterized by a method for manufacturing a composite optical component wherein, while the aforementioned optical functional device is kept in mechanical contact with the internal side surface of the holding part of the holding member by molding for integration with the holding member, the holding part of the aforementioned holding member is supported from the outside, thereby preventing the aforementioned holding part from being deformed. The manufacturing method configured in this manner prevents the holding member from being deformed in integration molding step, and provides a low-cost composite optical component characterized by a high degree of straightness.

The invention is characterized by a method for manufacturing a composite optical component wherein, while the aforementioned optical functional device is kept in mechanical contact with the internal side surface of the holding part of the holding member by molding for integration with the holding member, the holding part of the aforementioned holding member is supported from the outside, thereby preventing the aforementioned holding part from being deformed. The manufacturing method configured in this manner prevents the holding member from being deformed in integration molding step, and provides a low-cost composite optical component characterized by a high degree of straightness.

The invention is characterized by a method for manufacturing a composite optical component wherein at least a part in the vicinity of the contact surface of the aforementioned optical functional device in contact with the holding member is heated in excess of the thermal deformation temperature of the material resin. The manufacturing method configured in this manner allows easy formation of slide-fitted portions between the optical functional device and the holding member having a predetermined fixing force, and hence permits production of a high-performance composite optical component at a reduced cost.

The invention is characterized by a composite optical component wherein an optical functional device is held by a holding member for reinforcement, wherein the optical functional device and holding member are processed to become integrated into one body within the mold, and are slide-fitted with each other, where the composite optical component is manufactured wherein transfer of the optical function surface of the molding die for the optical functional device and slide-fitting between the optical functional device and holding member are provided in one and same molding step. The composite optical component configured in this manner is based on the manufacturing method ensuring a low cost and high degree of functions, so it is a low cost product, despite high degree of functions.

The invention is characterized by a long-sized composite optical component wherein the longitudinal length is 50 mm or more. The composite optical component according to the invention configured in this manner is a low-cost composite optical component characterized by a high degree of straightness and function, despite a long-sized configuration.

The invention is characterized by a composite optical component wherein the optical functional device comprises lenses, prisms or mirrors arranged in multiple numbers. The composite optical component configured in this manner is a low-cost component characterized by high precision and a high degree of straightness, although it is a long-sized component consisting of multiple optical devices requiring high precision.

The invention is characterized by an optical writing unit equipped with a composite optical component. The optical writing unit configured in this manner is a high-performance and low-cost optical writing unit because it is equipped with a composite optical component.

The invention is characterized by an optical reading unit equipped with a composite optical component. The optical reading unit configured in this manner is a high-performance and low-cost optical reading unit because it is equipped with a composite optical component The invention is characterized an image forming apparatus equipped with an optical writing unit. The image forming apparatus configured in this manner is a high-picture quality and low-cost image forming apparatus since it is equipped with an optical writing unit.

The invention is characterized by an image reading apparatus equipped with the optical reading unit. The image reading apparatus configured in this manner is a high resolution and low-cost image reading apparatus because it is equipped with the optical reading unit.

BRIEF DESCRIPTION OF THE DRAWINGS

FIG. 1 is a perspective view representing a composite optical component according to the First invention;

FIGS. 2A and 2B are explanatory diagrams representing the Embodiment 1 of the First Invention;

FIG. 21A is front view representing a composite optical member according to the Embodiment 1 of the Third invention, and FIG. 21B is a side view of FIG. 21A;

FIG. 22A is a front view representing a method for manufacturing a composite optical component according to the Embodiment 2 of the Third Invention, and FIG. 22B is a side view of FIG. 22A;

FIG. 24A is a front view representing the method for manufacturing a composite optical component according to the Embodiment 3 of the Third invention, FIG. 24B is a side view of FIG. 24A, and FIG. 24C is an enlarged view of section A in FIG. 24B;

FIG. 27A is a front view representing the composite optical component according to the Embodiment 4 of the Third invention, and FIG. 27B is a side view of FIG. 27A.

Figure 3A:
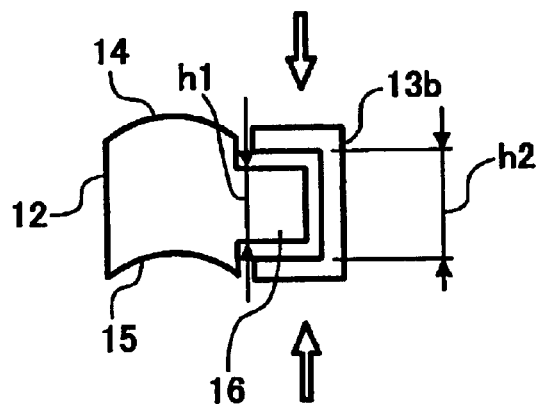
FIGS. 3A and 3B are explanatory diagrams representing the Embodiment 2 of the First Invention.

DETAILED DESCRIPTION OF THE PREFERRED EMBODIMENTS (First Invention)

FIGS. 1 to 12 illustrate the First Invention. FIG. 1 is a perspective view representing a composite optical component 11 according to the First Invention. This composite optical component 11 comprises an (optical) functional device 12 and a holding member 13 combined with the functional device 12 into a composite body. The functional device 12 comprises a high-precision plastic molded product (especially such an optical device as a lens and mirror) used in an optical scanning system such as a copying machine, facsimile machine and solid-stage scanning type printer. The functional device 12 is designed in a thin-walled long-sized configuration, and the surface and back have mirror surfaces 14 and 15, respectively. Further, an installation portion 16 such as a flange is mounted on the side of the functional device 12. The holding member 13 is a metallic long-sized material having an approximately U-shaped section and is mounted on the installation portion 16. In FIG. 1, numeral 18 denotes the shrinkage of the functional device 12, and numeral 19 denotes the shrinkage of the holding member 13.

Firstly, in the First Embodiment, the functional device 12 is sandwiched by the holding member 13 and is formed in a composite body, as shown in FIG. 2. In other words, a holding member 13a having a relationship of (thickness of installation portion 16 is h1)>(inlet width b2 of the holding member 13) is expanded, and is inserted into the installation portion 16 such as a flange to form a composite optical component 11.

This First Embodiment provides a simplified method, and is very effective because, once a composite body is formed, there is only a small change in straightness under loads and in the operating environment (changes in temperature).

Figure 3B:
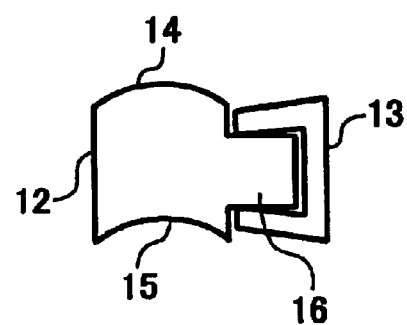

In the Second Embodiment, the functional device 12 is caulked by the holding member 13 as shown in FIG. 3, and is formed into a composite body. In other words, a holding member 13b having a relationship of (thickness of installation portion 16 is h1)<(inlet width b2 of the holding member 13) is inserted into the installation portion 16, and is crushed and caulked under this condition to form a composite optical component 11.

This Second Embodiment also provides a simplified method, and is very effective because, once a composite body is formed, there is only a small change in straightness under loads and in the operating environment (changes in temperature).

Figure 4A:
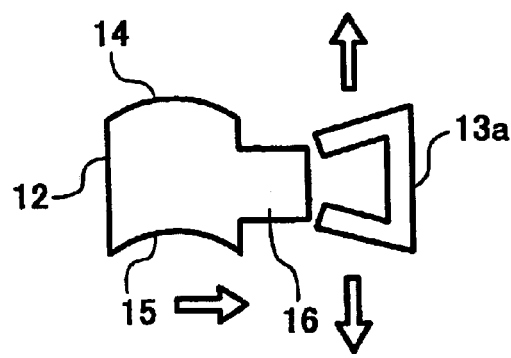
FIGS. 4A and 4B are explanatory diagrams representing the Embodiment 3 of the First Invention.
Figure 4B:
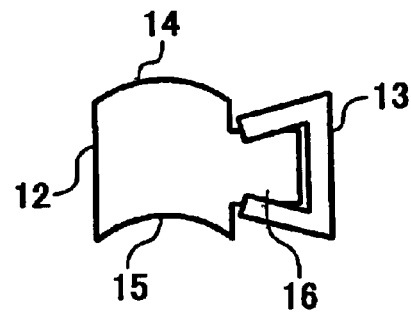

In the Third Embodiment, the functional device 12 is sandwiched by the holding member 13a, as shown in FIG. 4, and the functional device 12 is subjected to plastic deformation to be formed into a composite body. Namely, the holding member 13 is sandwiched by the installation portion 16 of a molded product with such a force that it is subjected to plastic deformation.

This Third Embodiment, similarly to the aforementioned First and Second Embodiments, is very effective because, once a composite body is formed, there is only a small change in straightness under loads and in the operating environment (changes in temperature). Further, smooth engagement between the functional device 12 and holding member 13 is ensured by plastic deformation, and this portion serves as a guide. Accordingly, even if misalignment is caused due to the difference in linear expansion in the operating environment (changes in temperature), straightness can be maintained.

Figure 5A:
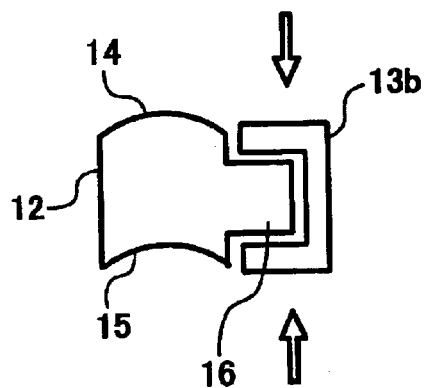
FIGS. 5A and 5B are explanatory diagrams representing the Embodiment 4 of the First Invention.
Figure 5B:
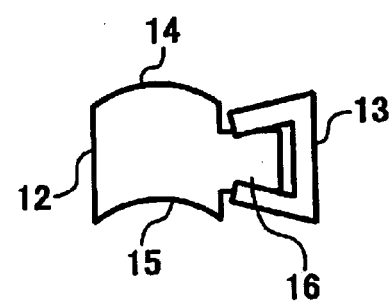

In the Fourth Embodiment, the functional device 12 is caulked by the holding member 13b as shown in FIG. 5, and the functional device 12 is subjected to plastic deformation to be formed into a composite body. Namely, it is caulked with such a force that the installation portion 16 of the molded product is subjected to plastic deformation by the holding member 13.

This Fourth Embodiment, similarly to the aforementioned Embodiments, is very effective because once a composite body is formed, there is only a small change in straightness under loads and in the operating environment (changes in temperature). Further, smooth engagement between the functional device 12 and holding member 13 is ensured by plastic deformation, and this portion serves as a guide. Accordingly, even if misalignment is caused due to the difference in linear expansion in the operating environment (changes in temperature), straightness can be maintained.

Figure 6A:
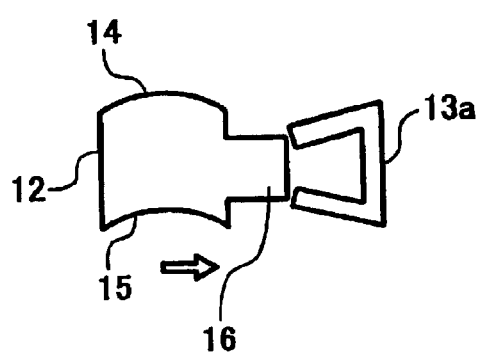
FIGS. 6A and 6B are explanatory diagrams representing the Embodiment 5 of the First Invention.
Figure 6B:
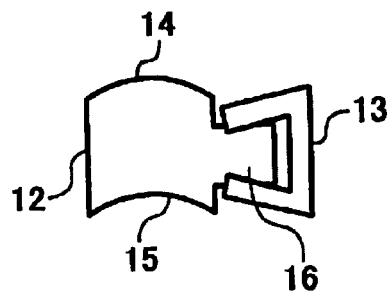

In the Fifth Embodiment, the functional device 12 is press-fit into the holding member 13b, as shown in FIG. 6, and the functional device 12 is subjected to plastic deformation to be formed into a composite body. Namely, it is press-fit into the holding member 13, while the installation portion 16 is subjected to plastic deformation.

This Fifth Embodiment, similarly to the aforementioned Embodiments, is very effective because, once a composite body is formed, there is only a small change in straightness under loads and in the operating environment (changes in temperature). Further, smooth engagement between the functional device 12 and holding member 13 is ensured by plastic deformation, and this portion serves as a guide. Accordingly, even if misalignment is caused due to the difference in linear expansion in the operating environment (changes in temperature), straightness can be maintained.

Figure 7A:
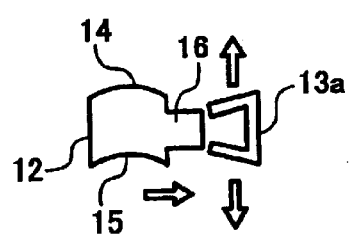
FIGS. 7A, 7B, and 7C are explanatory diagrams representing the Embodiments 6,7 and 10 of the First Invention.
Figure 7B:
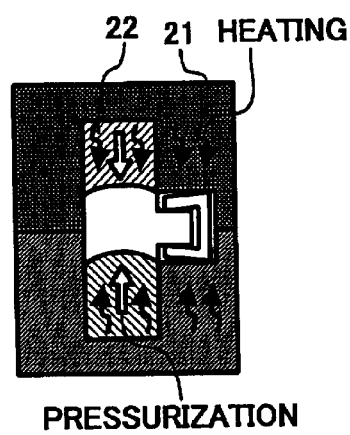
Figure 7C:
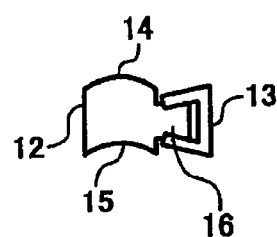
Figure 8A:
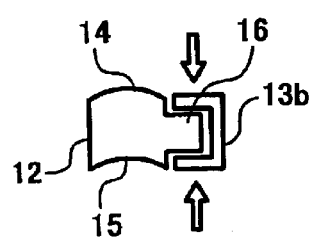
FIGS. 8A, 8B and 8C are explanatory diagrams representing the Embodiments 6,8 and 10 of the First Invention.
Figure 8B:
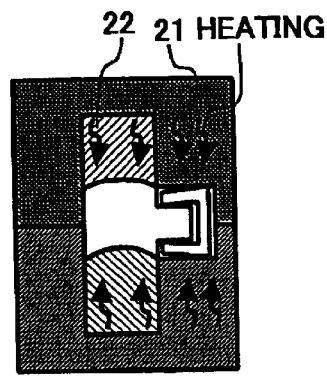
Figure 8C:
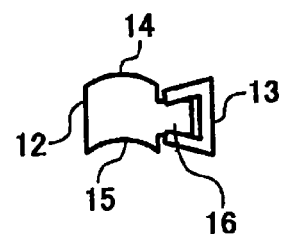

Further, in the Sixth Embodiment, the holding members 13a and 13b or functional device 12 is subjected to elastic deformation, as shown in FIGS. 7 and 8, to fix between the holding member 13 and functional device 12, and the functional device 12 is heated to cause plastic deformation, thereby reducing the stress between two components and allowing slide-fitting between the holding member 13 and functional device 12. In other words, the holding member 13 is subjected to elastic deformation at first to fix the functional device 12 in position (FIGS. 7A and 8A). Then the functional device 12 is heated over the thermal deformation temperature in a mold apparatus 21 and is soften. Then the installation portion 16 of the functional device 12 is subjected to deformation (FIGS. 7B and 8B) with resilient restoring force of the holding member 13. Further, the functional device 12 is fixed in position by cooling with a cooling means (not shown), and at the same time, and clearance is armed by the difference of shrinkages between two components, with the result that a composite body is formed (FIGS. 7C and 8C).

Here the resilient restoring force of the holding member 13 is used to allow slide-fitting between the functional device 12 and holding member 13. As a result, direct force occurs between two components to ensure slide-fitting characterized by very smooth engagement. Further, since external force is not used, the structure of the apparatus is simplified, and the cost is reduced.

Slide-fitting of the composite portions is caused by the following reason: A composite body is firmed at the temperature (+10 to 30 degrees Celsius) a slightly higher than the thermal deformation temperature of the functional device 12. So adhesion is reduced and the functional device 12 and holding member 13 are separated from each other due to the difference of shrinkage between materials while being cooled down to the room temperature. For example, assuming that the linear expansion coefficient of the holding member 13 is $12 \times 10^{-6}$ (carbon steel), that of functional device 12 is $60 \times 10^{-6}$ (plastic), thermal deformation temperature less room temperature is 100 degrees Celsius, and the thickness "h" of the holding member 13 is 21 mm, the difference of shrinkage is obtained as follows: $(60-12) \times 10^{-6} \times 100 \times 1 = 0.005$ mm = 5 $\mu$m. Thus, one get a smooth slide-fitting portion having a clearance of 5 $\mu$m.

In this case, it is possible to sandwich the functional device 12 by causing elastic deformation to the holding member 13a, as shown in FIG. 7 (Seventh Embodiment), to caulk the functional device 12 by causing elastic deformation of the holding member 13b, as shown in FIG. 8 (Eighth Embodiment), or to press-fit the functional device 12 into the holding member 13 by causing elastic deformation of the functional device 12 (not illustrated) (Ninth Embodiment).

Further, in the mold apparatus 21, transfer of the shape of molding die functional surface is carried out in one and the same process using a mirror surface molding die 22 within the mold apparatus, as shown in FIGS. 7B and 8B (Tenth Embodiment). In other words, transfer of the shape of the molding die functional surface, and slide-fitting between the functional device 12 and holding member 13 are carried out in one and the same molding step, thereby molding an integral body.

Figure 9A:
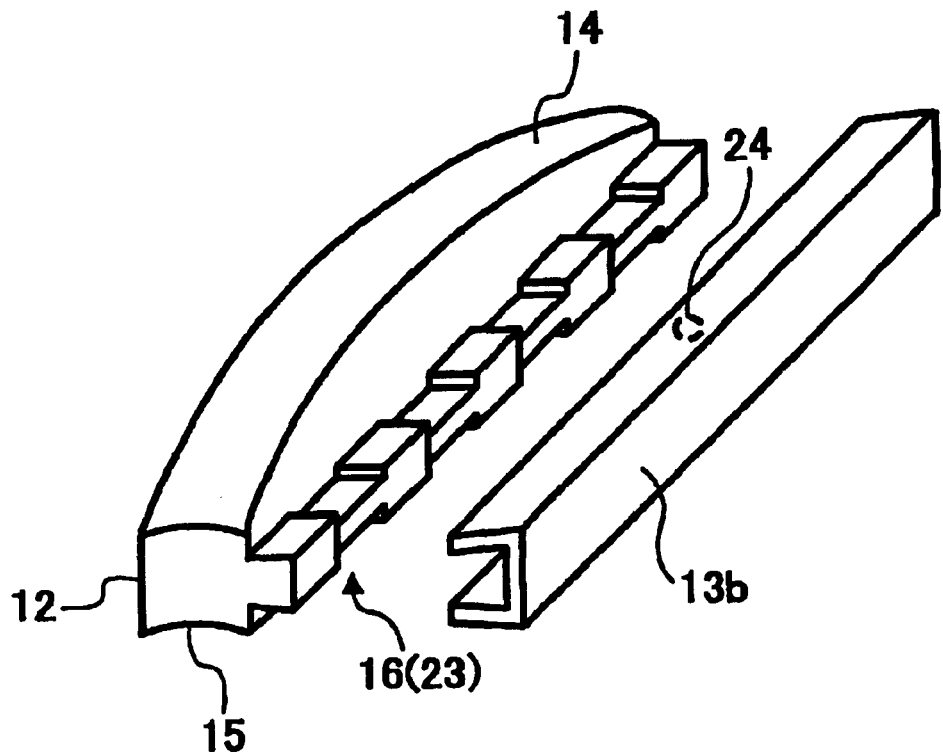
FIGS. 9A and 9B are explanatory diagrams representing the Embodiment 11 of the First Invention.
Figure 9B:
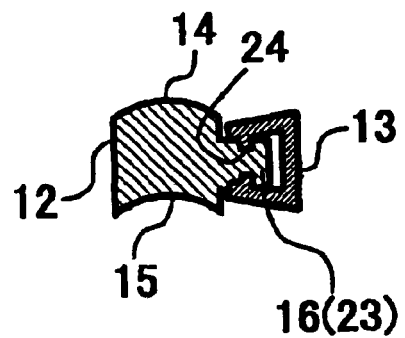

In addition, in the Eleventh Embodiment, a rugged surface (rugged portion 23) is produced on part of the installation portion 16 of the functional device 12 on the holding member 13, as shown in FIG. 9. In this way, the slide-fitting force (friction force) can be adjusted in an arbitrary manner by changing the contact area of the functional device 12 and holding member 13. In this case, a protrusion 24 can be provided at the central portion of the holding member 13 to keep it immobile so that this portion serves as a reference, as shown in FIG. 9B.

Figure 10:
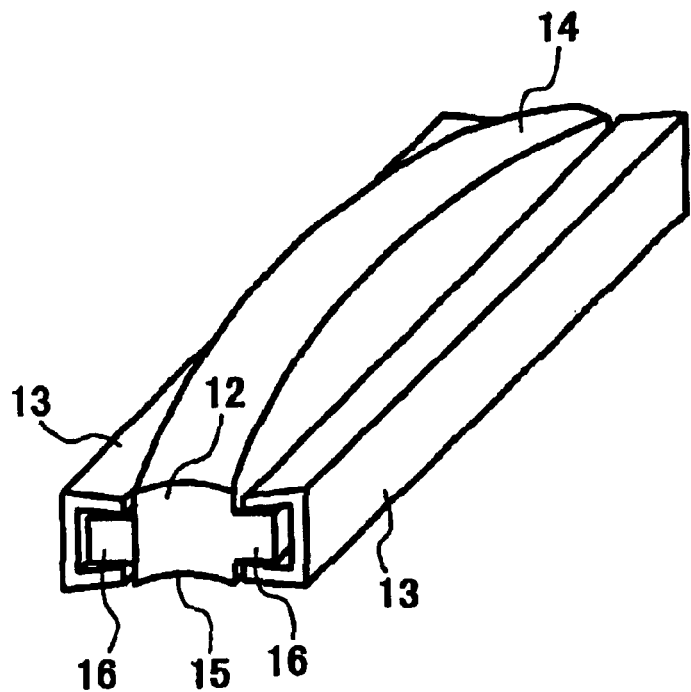
FIG. 10 is an explanatory diagram representing the Embodiment 12 of the First Invention.
Figure 11:
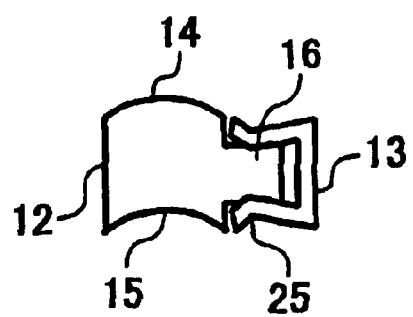
FIG. 11 is an explanatory diagram representing the Embodiment 13 of the First Invention.

According to the Twelfth Embodiment, at least parts of the installation portion 16 of the functional device 12 on the holding member 13 are provided at symmetrical positions, as shown in FIG. 10. In FIG. 11, flanges are located at bilaterally symmetrical positions with respect to the functional device 12. This configuration ensures a symmetrical temperature distribution during molding, and hence provides a composite optical component 11 characterized by small bending.

According to the Thirteen Embodiment, a part of the holding member 13 is bent and a guide 25 extending in the longitudinal direction is provided, as shown in FIG. 11. This configuration allows the relative position between the functional device 12 and holding member 13 to be shifted in a certain direction along the guide 25 in the event of temperature changes.

Figure 12A:
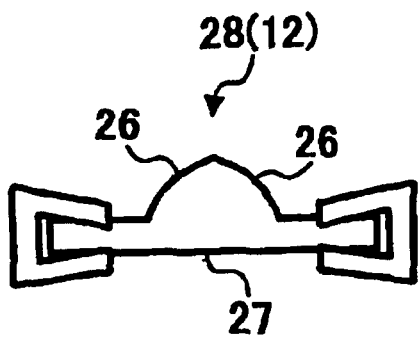
FIGS. 12A and 12B are explanatory diagrams representing the Embodiment 14 of the First invention.
Figure 12B:
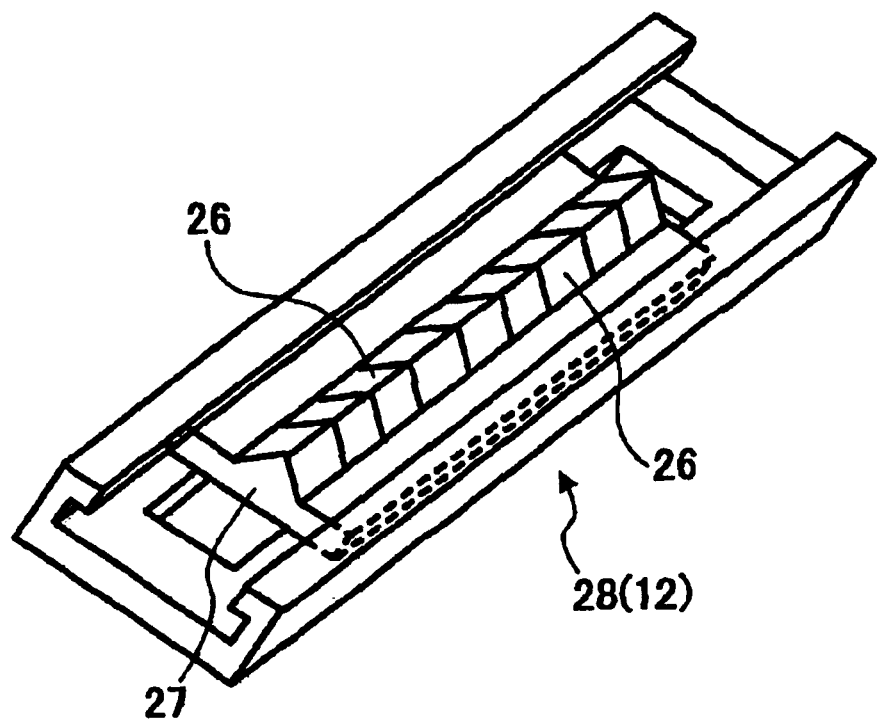

According to the Fourteenth Embodiment, the functional device 12 is formed as an optical device 28 comprising one or more of any of a lens 26, prism 27 and mirror, as shown in FIG. 12. A functional device 12 with multiple lenses 26 and 27 arranged thereon is used In FIG. 12.

The Fourteenth Embodiment allows the thin-walled long-sized optical device 28 to be formed into a composite body in the most effective manner.

(Second Invention)

1. Embodiment 1

Figure 13A:
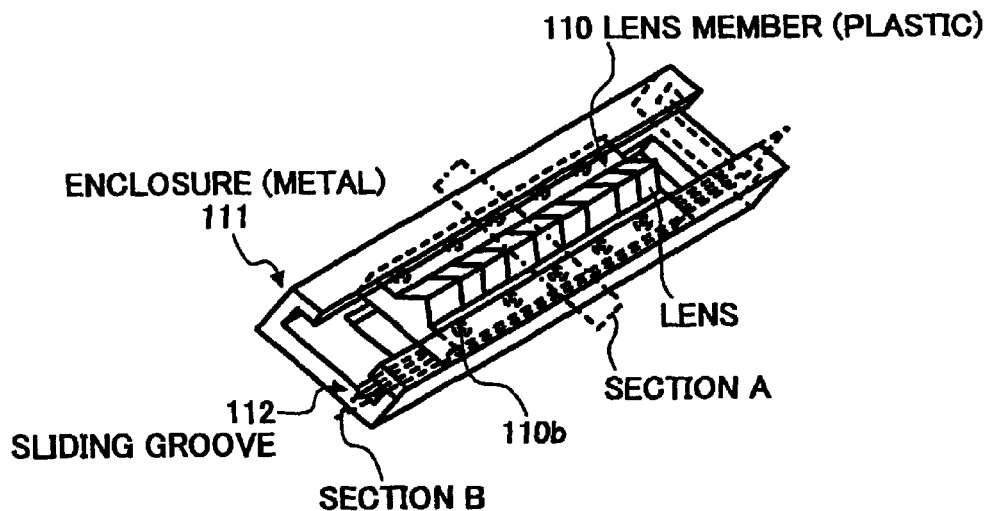
FIG. 13A is a perspective view representing the Embodiment 1 of the Second invention.
Figure 13B:
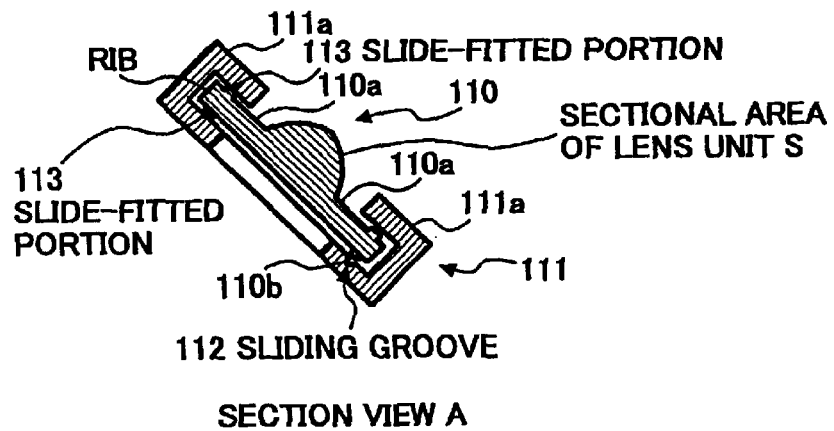
FIG. 13B is a cross sectional view taken in section A in FIG. 13A.
Figure 13C:
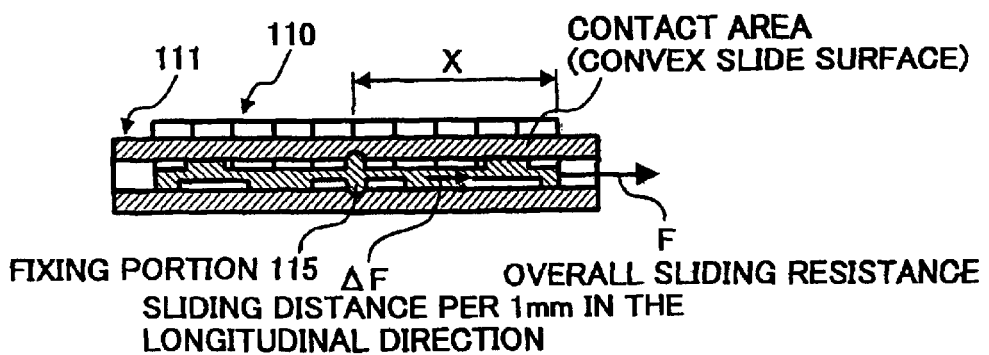
FIG. 13C is a cross sectional view taken in section B in FIG. 13A.
Figure 14:
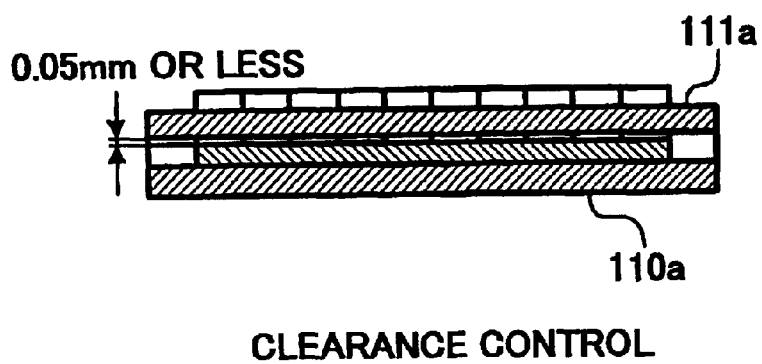
FIG. 14 is a cross sectional view showing the section B in FIG. 13 representing the clearance between the rib of the optical component and the holding part of the enclosure.

The following describes the Embodiment 1 of the Second Invention with reference to FIGS. 13 and 14.

The Embodiment 1 of the Second Invention is a composite long-sized optical component comprising a plastic molded product (lens member) and an enclosure for maintenance of optical characteristics.

A lens member 110 (optical functional device) has ribs 110a and 110a arranged on both sides, while an enclosure 111 (holding member) has holding parts 111a and 111a with a U-shaped section provided on both sides. The aforementioned rib 110a is fitted slidably into the holding part 111a, and the lens member 10 is held by the enclosure 111. Hemispherical contact protrusions 110b are provided at specified intervals on both upper and lower sides of the aforementioned ribs 110a and 110a of the lens member 110, while a slender sliding groove 112 having V-shaped section is formed on the bottom surface of the holding parts 111a of one of the enclosure 111. When the aforementioned rib 110a is fitted slidably to the holding part 111a, a slide-fitted portion 113 is formed wherein the aforementioned contact protrusion 110b and the inner surface of the holding part 111a are brought in a slidable light mechanical contact with each other. This permits smooth sliding of the aforementioned ribs 110a and 110a of the lens member 110 with respect to the holding parts 111a and 111a of the enclosure 111. Further, the tip of the hemispherical contact protrusion 110b of one of the rib s110a on the lens member 110 is fitted with the aforementioned V-groove 112. This allows the lens member 110 to be positioned across the width with respect to the enclosure 111, thereby stabilizing the state of combination.

Here the lens member 110 is made of plastic, glass, composite materials between plastic and glass, or another plastic composite material having different characteristics from those of plastic. The enclosure is made of plastic, metal such as aluminum or iron, or ceramic.

Materials of the lens member 110 and enclosure 111 can be selected with consideration given to the precision, operating environment and cost required of each composite long-sized optical component.

The following describes the characteristics (claim 14) relative to changes in temperature in the aforementioned Embodiment 1:

First, examples will be given to describe the sliding resistance between the lens member 110 and enclosure 111 wherein this lens member has a front length of 300 mm, a lens width of 2.5 mm and a full width of 8 mm including the ribs 110a on the right and left.

The lens member 110 in this Embodiment 1 is plastic, and the enclosure 111 is made of aluminum. Their linear expansion coefficient is 60×10^-6 and 23×10^-6, respectively. If the change in temperature is 25 degrees Celsius, a difference in expansion of 0.0009 mm per length of 1 mm occurs between the two. However, the tolerance "a" of the distortion of lens member 110 in this example is a =0.0001 mm per millimeter.

If the difference in expansion between the lens member 110 and enclosure 111 has reached the amount of distortion of the lens member 110, then distortion in excess of the tolerance appears on the lens surface in response to that change in temperature, with the result that the optical characteristics are reduced.

Assuming that the sectional area of the lens unit of the lens member 110 is S and the modulus of elasticity (longitudinal elastic coefficient) of the plastic is E, force F which distorts the lens member 110 by "a" per "b" across the length is calculated. Then one gets force F=a/b×S×E. If this difference in expansion is to be eliminated as a slide movement in the slide-fitted portion 113, the sliding resistance on this sliding surface must be not exceed this value. To take an example, if sectional area of the lens unit S=16 mm2, the modulus of elasticity of plastic E=0.25×1010 [Pa], a=0.001 mm, and b=1 mm are substituted, a sliding resistance F=4[N] is obtained. Thus, the sliding resistance must not exceed this value. Further, if longitudinal size "b" of this optical system is 300 mm, a=0.001×b=3 mm, hence the total force must not exceed F=4 [N].

If there is no restriction in the presence of a repeated change in temperature, misalignment may occur in the longitudinal direction. To avoid this misalignment, the lens member 110 must be fixed to the enclosure 111 somewhere. To avoid misalignment in the longitudinal direction while allowing the aforementioned difference in expansion to be eliminated smoothly, it is preferred to fix the lens member at one central point in the longitudinal direction of the lens member 110, as shown in FIG. 13C. In this example, the hemispherical contact protrusion 110b at the center is engaged with a concave formed on the bottom of the holding part 111a of the enclosure 111, and this is used as a fixing portion 15.

If there is no restriction in the lateral direction, misalignment will occur in the lateral direction due to changes in temperature. As described above, however, the hemispherical contact protrusion 110b of the rib 110a is engaged in the V-groove 112, and this avoids misalignment in the lateral direction.

The upper and lower inner surfaces between the hemispherical contact protrusion 110b and the holding part 111a have their contact surfaces subjected to elastic deformation, and are brought into mechanical contact at a predetermined surface pressure (sliding surface pressure at the slide-fitted portion 113). This sliding surface pressure is such that, while relative movement between the lens member 110 and enclosure 111 caused the expansion due to changes in temperature between them is allowed, relative movement caused by vibration and the like is avoided by the frictional resistance on the upper and lower internal surfaces between the aforementioned contact protrusion 110b and holding part 111a. In order to ensure that the frictional resistance on the upper and lower internal surfaces between the aforementioned contact protrusion 110b and holding part 111a has the aforementioned action, it is important to specify the surface pressure on the aforementioned sliding surface when the rib 10 is embedded in the holding part 111*a*.

In this example, the aforementioned F is preferred to meet the following: F≦2000[N].

Furthermore, even if foreign substances such as chips are located on the slide-way between the aforementioned contact protrusion 110*b* and V-groove 112, they can be pushed into the space between the contact protrusions 110*b* and 10*b*. They do not cut into the slide-way to hinder sliding of the contact protrusion 110*b*.

In this example, lateral misalignment preventive means (longitudinal slide guiding means) is provided by the fitting between the V-groove 112 and contact protrusion 110*b*. It is also possible to configure the structure wherein the V-groove 112 is replaced by a stripe-like protrusion of inverted V-shaped section, and the contact protrusion 110*b* of the rib 110*a* is replaced by a stripe-like groove of inverted V-shaped section, whereby they are fitted to each other. In this case, however, stripe-formed protrusions must comparatively intermittent one in order to permit removal of foreign substances having entered between the fitting sections of the stripe-like protrusion and the groove of the inverted V-shaped section.

In the aforementioned Embodiments, if there is a big clearance of the slide-fitted portion between the rib 110*a* of lens member 110 and the holding part 111*a* of the enclosure 111, a local inclination or bending will occur to the lens member 110, affecting the optical characteristics. However, the aforementioned local inclination or bending can be avoided by keeping the aforementioned clearance to a value not exceeding 50 μm or less. Thus, optical characteristics of the lens member 110 are not affected by the aforementioned local inclination or bending (FIG. 14).

2. Embodiment 2

Figure 15:
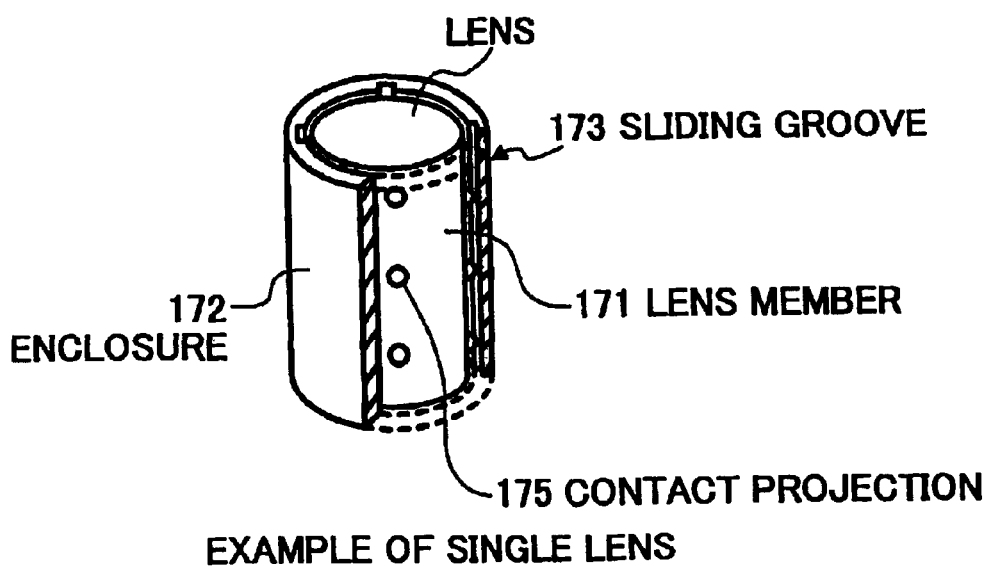
FIG. 15 is a perspective view representing the Embodiment 2 of the Second Invention.

The above description is concerned with an example of applying the Second Invention to the tabular long-sized optical lens. The following describes the example of applying the Second Invention to a single lens. FIG. 15 shows a composite single lens comprises a cylindrical lens member 171 fitted into a hollow cylindrical enclosure 172. Here four vertical sliding grooves 173 are provided on the inner peripheral surface of the enclosure 172 at an equally spaced interval. Opposite to this sliding groove 173, a hemispherical contact protrusion 175 is located on the outer periphery of the lens member 171. When the lens member 171 is fitted to a hollow cylindrical enclosure 172, the contact protrusion 175 is fitted with slide groove 173 and is brought into mechanical contact. While relative movement in the longitudinal direction caused by thermal expansion between the enclosure 172 and lens member 171 due to changes in temperature is allowed by the frictional resistance due to the surface pressure thereof, movement in the longitudinal direction due to vibration or the like is avoided. The proper value of this frictional resistance can be determined in the same manner as in Embodiment 1.

3. Embodiment 3

Figure 16:
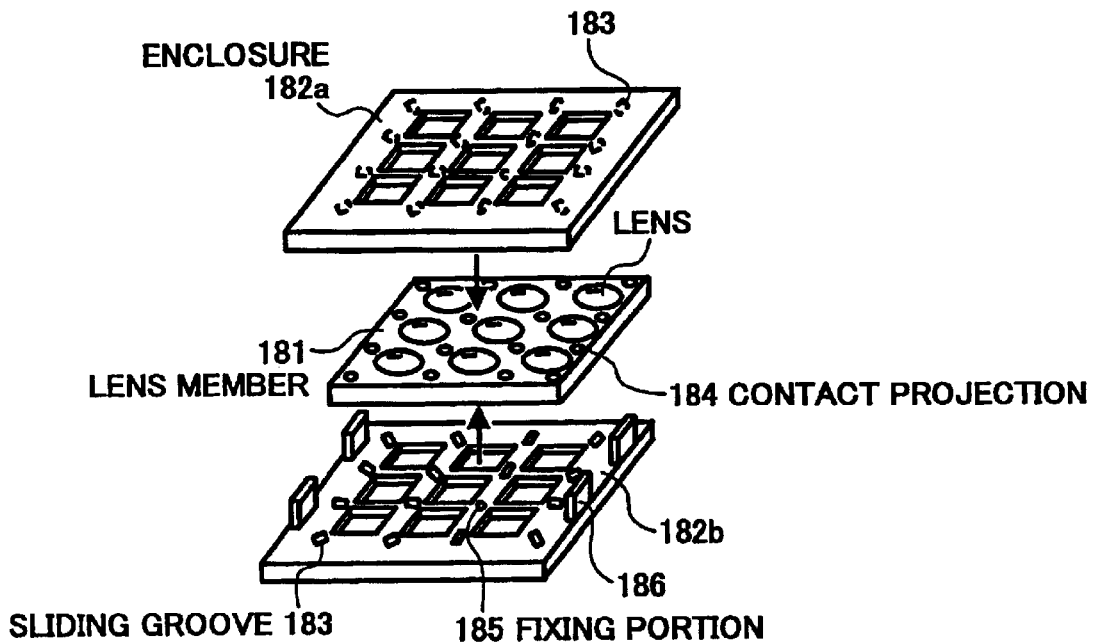
FIG. 16 is an exploded perspective view representing the Embodiment 3 of the Second Invention.
Figure 17:
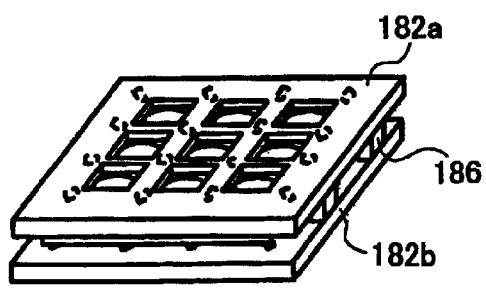
FIG. 17 is a perspective view representing the Embodiment 3 of the Second Invention.
Figure 18A:
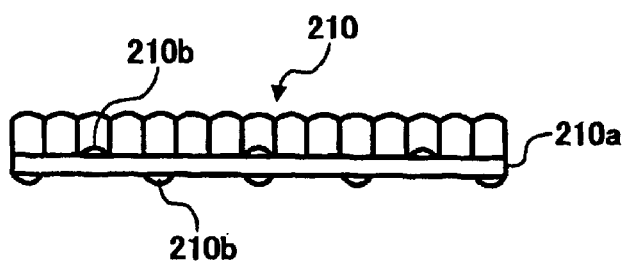
FIG. 18A is a front view representing the optical functional device (long-sized lens array) according to the art of the comparative example in the Third invention.
Figure 18B:
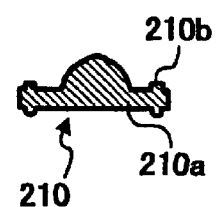
FIG. 18B is a side view of FIG. 18A.
Figure 18C:
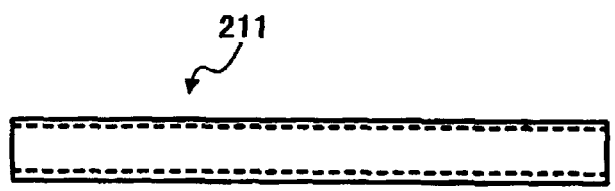
FIG. 18C is a front view of the holding member according to the art of the comparative example.
Figure 18D:
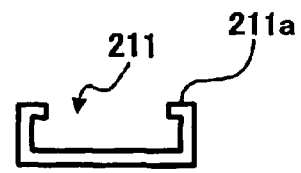
FIG. 18D is a side view of FIG. 18C.
Figure 18E:
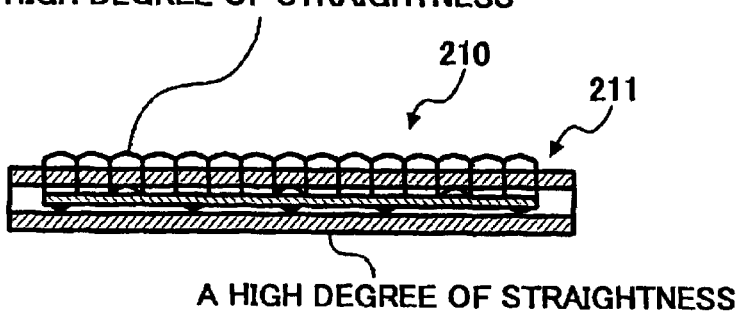
FIG. 18E is a front view of the composite optical component according to the art of the comparative example.
Figure 18F:
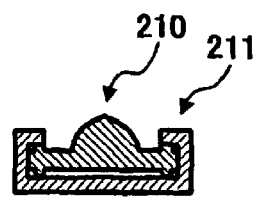
FIG. 18F is a side view of FIG. 18E.
Figure 19A:
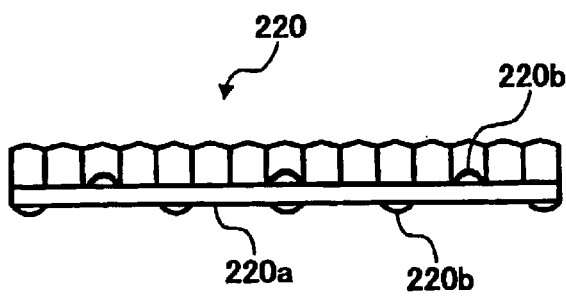
FIG. 19A is a front view representing the optical functional device (long-sized lens array) according to the Embodiment 1 of the Third Invention.
Figure 19B:
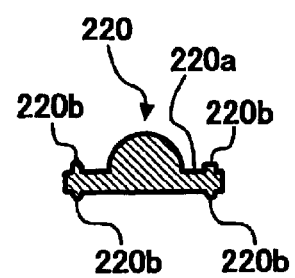
FIG. 19B is a side view of FIG. 19A.
Figure 19C:
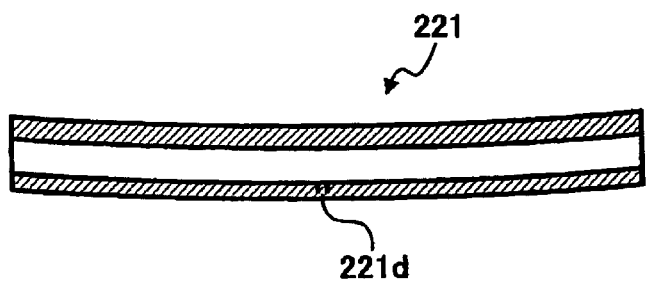
FIG. 19C is a front view of the holding member according to Embodiment 1.
Figure 19D:
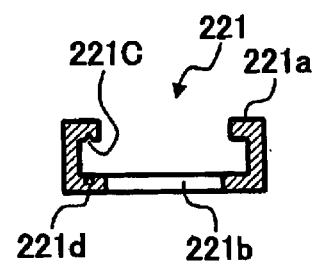
FIG. 19D is a side view of FIG. 19C.

Embodiment 3 shown in FIGS. 16 and 17 is an example of applying the Second Invention to a two-dimensional lens array. A rectangular tabular lens member 181 equipped with many lens sandwiched and held by enclosures 182*a* and 182*b* to form a composite two-dimensional lens area. Since the lens member 181 and enclosures 182*a* and 182*b* are thermally expanded in both vertical and horizontal directions, the direction of relative movement of the lens member 181 and enclosures 182*a* and 182*b* caused by thermal expansion is the same as the two-dimensional direction with the center of lens member 181 as an origin. The direction differs according to the positional relationship with respect to the aforementioned origin, and is the same as the direction of a sliding groove 183 shown in FIG. 16.

A hemispherical contact protrusion 184 is provided at a crossing point of the partition between the lens member 181 and the lens. This is located opposite the aforementioned sliding groove 183 of enclosures 182*a* and 182*b*. A groove corresponding to the contact protrusion at an approximate center of enclosures 182*a* and 182*b* is a fixing portion 185 comprising a simple concave. This positions the lens member 181 and enclosures 182*a* and 182*b*. Accordingly, the lens member 181 and enclosures 182*a* and 182*b* make a relative movement by thermal expansion in almost radial direction with the aforementioned fixing portion 185 as a fixing point.

When the lens member 181 is sandwiched and fixed by enclosures 182*a* and 182*b*, the contact protrusion 184 is fitted to the sliding groove 183 and is brought in mechanical contact. The frictional resistance caused by the surface pressure thereof allows relative movement in the two-dimensional direction due to thermal expansion enclosures 182*a* and 182*b* and lens member 181 caused by changes in temperature, and prevents movement in the same direction caused by vibration and the like. The proper value of this frictional resistance can be determined in the same manner as in Embodiment 1.

Further, columns 186 are provided on a pair of opposite sides of the enclosure 182*b*, the mechanical contact on the mechanical contact surface between the hemispherical contact protrusion 184 and sliding groove 183 is controlled by defining the space between enclosures 182*a* and 182*b* according to these columns 186 so that frictional resistance will be kept less than the predetermined value.

The Embodiments described above are concerned with the optical composite member where the optical member is a lens. The same description applies to the case where the composite optical component is a mirror. Long-term stabilization of the optical equipment can be improved substantially by using of the composite optical component based on these optical components for the optical printer, optical copying machine, image forming apparatus or image reading apparatus.

As described above, if bondage between the optical component and enclosure is too loose in the composite optical component, the optical component will be misaligned or inclined with respect to the enclosure due to repetition of vibration and thermal expansion and inclination of the composite optical component. If this bondage is too tight, internal distortion will occur to the optical component due to the difference in thermal expansion between the optical component and enclosure caused by changes in temperature. Optical characteristics will be reduced by this internal distortion. To solve these problems, the strength of frictional bondage between the optical component and enclosure is determined as described above, and part of the optical component is bonded to one point of the enclosure. This has solved both of the aforementioned problems.

It should be noted that the aforementioned advantages are ensured by the application of the Second Invention even when the optical component and enclosure are made of any one of plastic, metal and glass, or even when the optical component and enclosure are made of different composite optical components.

Furthermore, the optical characteristics of the composite optical component are kept at an original high level, despite repeated changes in temperature. So use of the composite optical component according to the Second Invention prevents the performances of various types of optical equipment including the printer, copying machine, image forming apparatus and image reading apparatus from being deteriorated for a long time during their service life.

(Third Invention)

0. Art for Comparison

FIG. 18 represents a composite long-sized optical component consisting of a combination of a long-sized lens array (optical functional device) and a reinforcing member (holding member). This is different from the Third Invention. Although it is not a known art, it serves as an example for comparison in the context of the present invention. For this reason, the following describes this art for comparison.

A ribs 210a is installed on each of the right and left of a plastic long-sized lens array (optical functional device) 210. A protrusion 210b is formed on each of the front and back of this rib 210a.

In the meantime, a holding part 211a having a U-shaped section is mounted on each of the right and left of a reinforcing member 211 as an aluminum extrusion product. Ribs 210a on the right and left sides of a long-sized lens array (optical functional device) are fitted into the holding part 211a of the holding member 211 so as to permit slide-fitting (fitting and fixing to ensure stable holding and bondage to such an extent that sliding by a predetermined force is allowed). The long-sized lens array 210 is built in the holding member 211 to form a composite body, and the long-sized lens array 210 is reinforced by the holding member 211.

The following describes the composite optical component production procedures in this art for comparison:

1) Mold a long-sized lens array (optical functional device) 210 characterized by sufficient molding precision to meet the specifications.

Longitudinal straightness of the function unit of the composite component: 30 µm or less in conformity to specifications Measured straightness of the function unit of the molded product :17 µm 2) Mold a holding member 211 with a high degree of straightness on the surface in contact with optical the functional device 210.

Aluminum extruded products are cut to get a high degree of straightness

Longitudinal direction straightness: 13 µm as measured value for of holding member 3) Insert the optical functional device 210 into the holding member 211, and bond and fix a contact surface at one point to determine a reference.

Straightness of the function unit of the composite optical device: 27 µm

This makes slidable the contact surfaces between the optical functional device 210 and holding member 211 except for the fixing point (contact surfaces between a protrusion 210b and a holding part 211a), and they are slide-fitted in a play-free state. So distortion does not occur to the long-sized lens array (optical functional device) 210, despite the difference in thermal expansion between the long-sized lens array (optical functional device) 210 and holding member 211. This eliminates possible deterioration of optical performance of the long-sized lens array 210 due to the aforementioned distortion.

In the case of Art for Comparison, straightness of the element function unit (optical function unit of the long-sized lens array 210 in composite component) of the composite component is slightly lower than that of the molded product of the long-sized lens array 210 as a single product. So the straightness which the molded product of the long-sized lens array 210 is required to provide is higher than that of the composite component required in the specifications. This raises the molding cost of the long-sized lens array 210. In addition, the holding member 211 per se is required to provide a high degree of straightness. This will increase the machining cost of the holding member 211. Further, much time and effort is required in the step of assembling the optical functional device 210 and holding member 211, and higher Costs are necessary to form a composite body. As a result, the manufacturing cost of the composite long-sized optical component is inevitably increased 1. Embodiment 1

The composite long-sized lens array according to this Embodiment 1 is made of 75 mm long, 21 mm wide and 8 mm high polycarbonate (glass transition point at 140 degrees Celsius). The holding member (reinforcing member) is made of an aluminum extruded product.

[Manufacturing Method]

The following shows how to manufacture according to this Embodiment 1:

1) Mold the high-precision spare molded product 220 of the functional device (long-sized lens array) close to the final form by injection molding. This spare molded product 220 is provided with protrusions 220b at several positions to come in contact with a holding part 221a of a holding member 221. Straightness of this spare molded product 220 was 140 µm (FIG. 19)

2) A central hole 221b is formed by hole stamping at the center of the bottom of the holding part 221a of aluminum extruded holding member 221 in the longitudinal direction.

Straightness of this holding member 221 can be lower than the value given in the specifications of the composite long-sized optical component. In this Embodiment, straightness of the surface in contact with the functional device of holding member 221 is about 52 µm.

At the time of extrusion, a groove 221c in the longitudinal direction is formed on the surface opposite to one of the holding parts 221a of the holding member 221. A hole for reference position (1.5 mm in diameter) 221d is formed at the center of the aforementioned holding part 221a in the longitudinal direction.

3) Insert into the holding member 221 the spare molded product 220 prepared according to the aforementioned method, and mount it on the finish-molding apparatus.

Figure 20A:
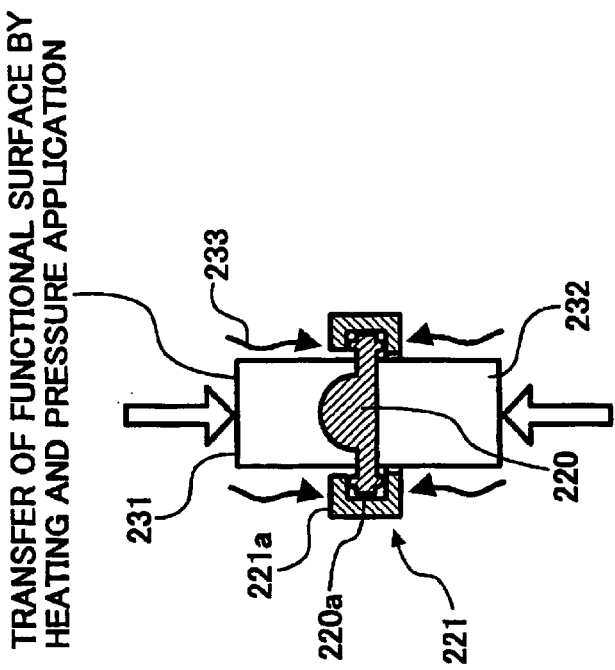
FIG. 20A is a front view representing the method for manufacturing composite optical component according to the Embodiment 1 of the Third Invention.
Figure 20B:
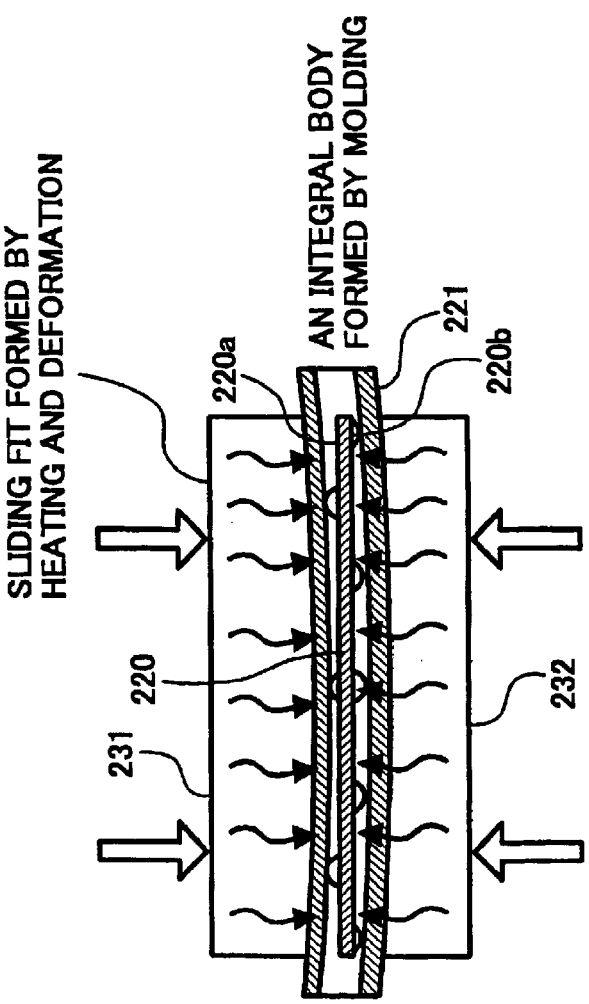
FIG. 20B is a side view of FIG. 20A.

With the spare molded product 220 mounted on the finish-molding apparatus, use a heater in the apparatus to heat the spare molded product 220 up to 150 degrees Celsius. Then apply pressure using the molding dies 231 and 232 having the optical functional surface of the long-sized lens array so that the optical functional surface of the molding dies 231 and 232 is transferred. During this pressure transfer, use another heater 233 to heat the holding part 221a of the holding member 221 up to 145 degrees Celsius and soften it in such a way that the holding part 221a is deformed to the form conforming to the rib 220a of the spare molded product 220 so as to be slide-fitted. At the same time, softened resin enters the aforementioned reference hole 221d and the aforementioned groove 221c so that it is engaged with the aforementioned hole 221d. Further, the aforementioned protrusion 220b is fitted into the groove 221c in a state just conforming thereto (FIG. 20).

After pressurized molding, it is cooled up to 130 degrees Celsius at a speed of 5 degrees Celsius/min., and the composite component molded in one integrated body is taken up from the apparatus (FIG. 21).

[Result]

Although straightness of the spare molded product 220 and holding member 221 was considerably lower than that defined in the specifications (30 μm or less) of the composite component, the straightness of the optical function unit of the finally finished long-sized lens array was 22 μm.

Since the mold can be released in the form reinforced by the holding member 221, deformation of the optical function unit and variations in deformation are very small at this time of mold releasing. Accordingly, high-precision optical functional device is molded in stable manner.

In addition, resin enters the reference hole 221d and groove 221c, and the long-sized lens array is fixed at the position of the reference hole 221d. This is used as a fixing point for sliding in the longitudinal direction in the event of thermal expansion and shrinkage. As a result, internal distortion does not occur in the longitudinal direction. Accordingly, straightness in the range of composite long-sized lens operating temperature (from −5 to 60 degrees Celsius) is kept at 28 μm or below. Thus, straightness could be kept within the reference value of 30 μm.

The sliding resistance of the sliding resistance in the longitudinal direction per unit length of measurement was 4.8 [N]. In order to ensure that the internal distortion of the long-sized lens array (internal distortion in the longitudinal direction) caused by difference in thermal expansion from that of the holding member 221 is kept within the tolerance range, the fixing force (ΔF) per unit length between the long-sized lens array and holding member 221 must be ΔF=a×S×E (where "a" denotes a permissible limit internal distortion per unit length of the long-sized lens array, "S" denotes a sectional area of the long-sized lens array, and "E" denotes a longitudinal elastic coefficient of the long-sized lens array). When a=0.001 mm, E=0.25×10^10 [Pa] and S=42 mm^2 are substituted into this equation, one get ΔF=a×S×E=10.5 [N]. The sliding resistance 4.8 [N] per unit length in this Embodiment 1 is half the aforementioned 10.5 [N] or less. This shows that there is no deterioration of optical characteristics of the long-sized lens array caused by internal distortion due to difference in thermal expansion.

When compared with the step in the aforementioned Art for Comparison in FIG. 18 (molding step+assembling step), there is no particular difference in that the injection molding step and assembling step are necessary. However, the injection molding cycle can be reduced because there is no problem even if molding precision of the aforementioned spare molded product 220 is very low. This substantially improves the productivity in the injection molding step of long-sized lens array materials. Furthermore, there is no assembling process wherein a high degree of assembling precision, hence, much time and effort is required. Thus, according to this Embodiment 1, the total manufacturing cost of the composite long-sized optical component could be reduced as much as 55%, as compared to the case in conformity to the Art for Comparison in FIG. 18.

2. Embodiment 2

Similarly to Embodiment 1, Embodiment 2 represents an example of applying the present invention to a composite long-sized optical component based on a long-sized lens array. The mechanism and structure of the composite long-sized optical component are basically the same as those of Embodiment 1.

[Manufacturing Method]

A manufacturing method according to the Embodiment 2 is shown in FIG. 22. This manufacturing method is basically the same as the Embodiment 1, but is different in the following three points:

1) There is no protrusion for bringing an injection molded product in contact with a holding member 241.
2) A slide-fitting method is used.
3) The holding member 241 uses the injection molded product based on resin material reinforced by glass fiber.

Figure 23:
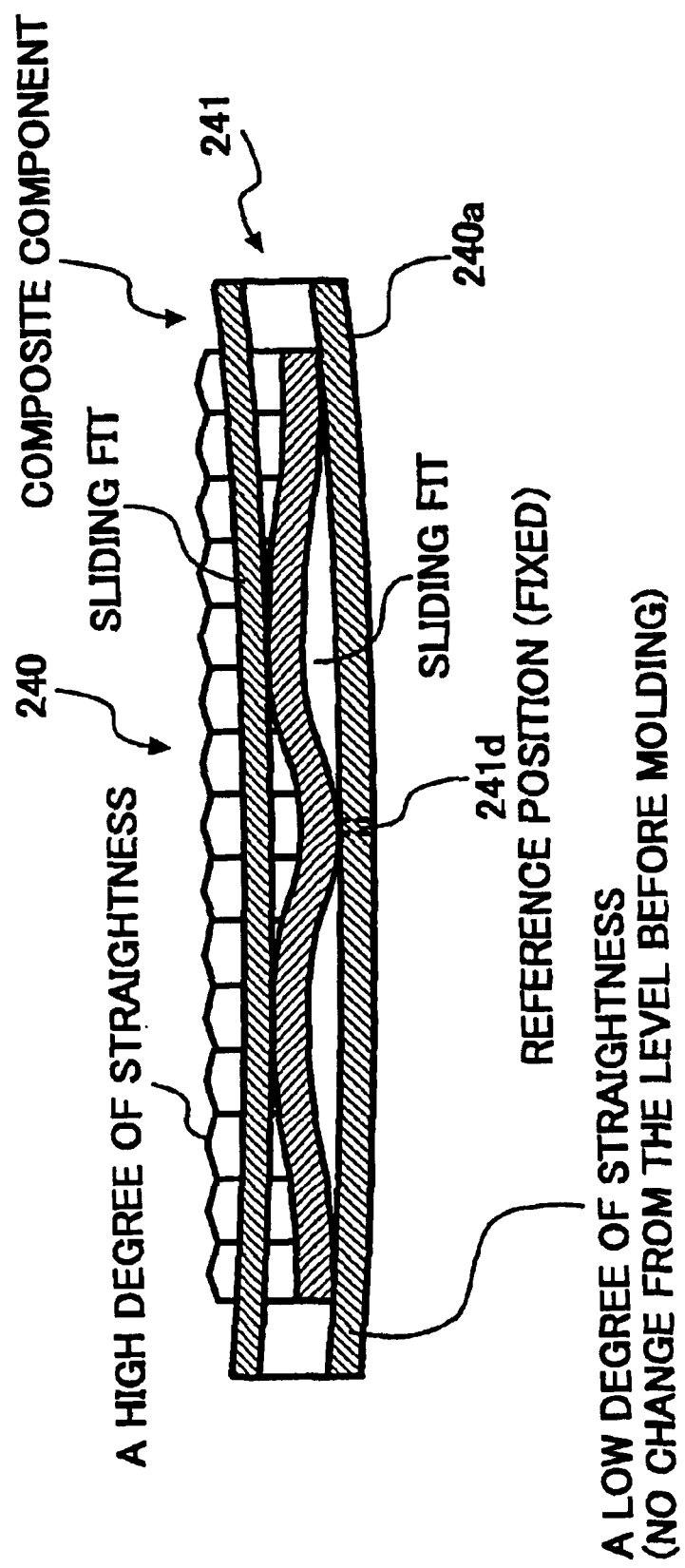
FIG. 23 is a front view representing a composite optical component according to the Embodiment 2 of the Third invention.
Figure 25A:
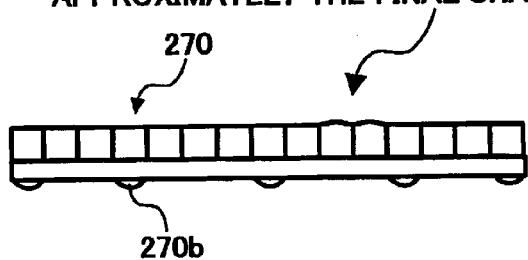
FIG. 25A is a front view representing an optical functional device (long-sized lens array) according to the Embodiment 4 of the Third Invention.
Figure 25B:
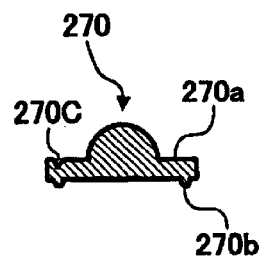
FIG. 25B is a side view of FIG. 25A.
Figure 25C:
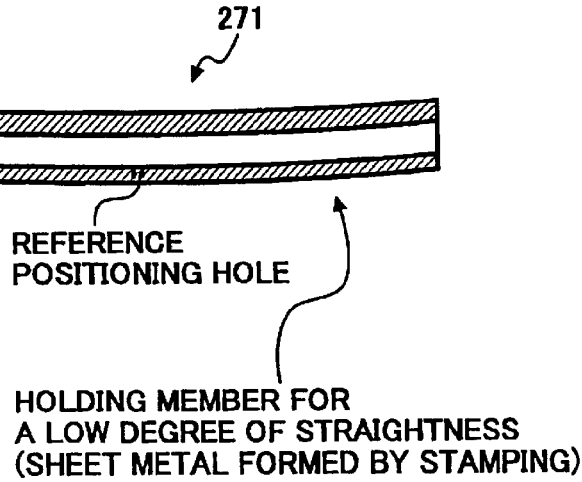
FIG. 25C is a front view representing the holding member of the Embodiment 4.
Figure 25D:
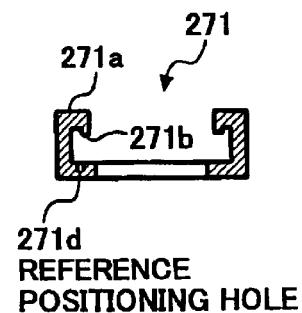
FIG. 25D is a side view of FIG. 25C.

In this Embodiment 2, a spare molded product 240 of the long-sized lens array and a rib 240a without protrusion formed on the front and back surfaces are held by the holding parts 241a on the right and left sides of the holding member 241. This is achieved by the following means for slide-fitting formation: When pressure is applied to the spare molded product 240 by molding dies 231 and 232 to transfer the shape of the optical functional surface, pressure is applied to the vicinity of the section of the rib 240a of the spare molded product 240 in contact with the holding member 241 by multiple pressure pins 251, as shown by arrows P and P in FIG. 22. Then external force is applied in the vertical direction, whereby the rib 240a is deformed. In the manner as stated above, the rib 240a of the spare molded product 240 is formed in a wave shape illustrated in FIG. 23, and slide-fitting is carried out in the state in contact with the holding member 241 at several points.

[Result]

Although the straightness of the spare molded product 240 and holding member 241 (molding material: 135 μm, holding member; 45 μm) was much greater than that straightness defined in the specifications for the composite optical component (30 μm or less), straightness of the optical function unit of the long-sized lens array in the composite optical component was 25 μm.

Furthermore, the total cost of the composite long-sized optical component (optical composite component of the long-sized lens array) in the Embodiment 2 was reduced as much as 65% as compared to the case of the aforementioned Art for Comparison.

In this Embodiment 2, a resin molded product reinforced with the glass fiber is used at the holding member 241, so there is an advantage that the required cost is lower than the processed metallic member. However, a metallic member is more preferred when a higher strength is required as a result of increased length.

3. Embodiment 3

Similarly to Embodiment, Embodiment 3 represents an example of applying the present invention to a fitted long-sized optical component based on a long-sized lens array. The mechanism and structure of the composite long-sized optical component are basically the same as those of Embodiment 1, except for the following points: 1) A protrusion 261b is formed on the internal side of a holding part 261a of a holding member 261 so that it is brought into a mechanical contact with the top surface of a rib 260a of a spare molded product.

[Manufacturing Method]

FIG. 24 shows a manufacturing method according to Embodiment 3. This manufacturing method is basically the same as that in Embodiment 1, except for the method for forming a slide-fitted portion wherein the rib 260a of the spare molded product 260 is held by the holding part 261a on the right and left sides of the holding member 261.

The following describes how to form slide-fitted portion in Embodiment 3;

When pressure is applied to the spare molded product by molding dies 231 and 232 to transfer the shape of the optical functional surface, resin having moved in the direction orthogonal to the axis direction of pressure is brought in contact with the holding member 261 by the pressure of molding dies 231 and 232, as shown in FIG. 24C.

The holding member 261 is expanded to the right and left sides and is deformed by resin pressure during heating and pressure application, and the spare molded product (long-sized lens array) 260 is formed to conform to the deformed holding member 261. So when resin has shrunken subsequent to pressure molding, the holding member 261 is restored by elastically deformed amount. The spare molded product (long-sized lens array) 260 is pushed instead by restoring the elasticity of this holding member 261, and the optical device is also deformed. This will lead to deterioration of straightness of the optical device. To avoid this, a horizontal pin 265 is made to abut on the external side of the holding member 261 to fix it in position, thereby avoiding the aforementioned deformation of the holding member 261 due to the resin pressure during the pressure molding step.

[Result]

Although the straightness of the spare molded product and holding member 261 (molding material: 140 $\mu$m, holding member: 55 $\mu$m) was much greater than that of the composite long-sized optical component defined in the specifications (30 $\mu$m or less), the straightness of the optical function unit based on a long-sized lens array in the composite long-sized optical component was 28 $\mu$m.

Furthermore, the total cost of the composite long-sized optical component was reduced 55% as compared with that according to the aforementioned Art for Comparison.

In this Embodiment 3, resin allows the contact surface area with holding member 261 to be increased. Increase in the contact surface area will cause the sliding resistance to be increased, and this may cause the internal distortion of the optical device resulting from the difference in thermal expansion from that of holding member 261. But this problem can be solved if the aforementioned sliding resistance is kept within a predetermined range. On the other hand, when the aforementioned contact surface area is larger and a certain sliding resistance is provided, more stable holding by the holding member 261 of the optical functional device is ensured, whereby stabilized optical performance of the composite optical component is provided.

4. Embodiment 4

Similarly to Embodiment 1, Embodiment 4 represents an example of applying the present invention to a composite long-sized optical component based on a long-sized lens array. The mechanism and structure of the composite long-sized optical component are basically the same as those of Embodiment 1 except for the following points (FIG. 25):

1) A protrusion 270b is formed on the bottom surface of a spare molded product 270 based on a long-sized lens array, and a longitudinal groove 270c on the top surface.

2) A vertical rib 271b is formed on the upper tip of a holding part 271a on the right and left sides of a holding member 271, and the bottom of this vertical rib 271b is guided by the aforementioned groove 270c.

[Manufacturing Method]

Figure 26B:
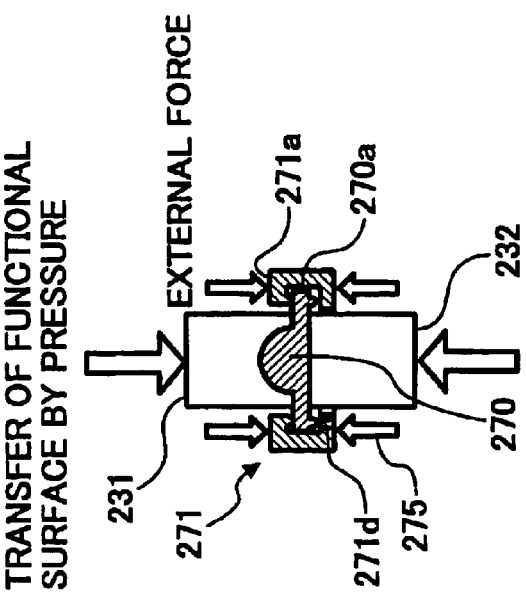
FIG. 26B is a side view of FIG. 26A.
Figure 26A:
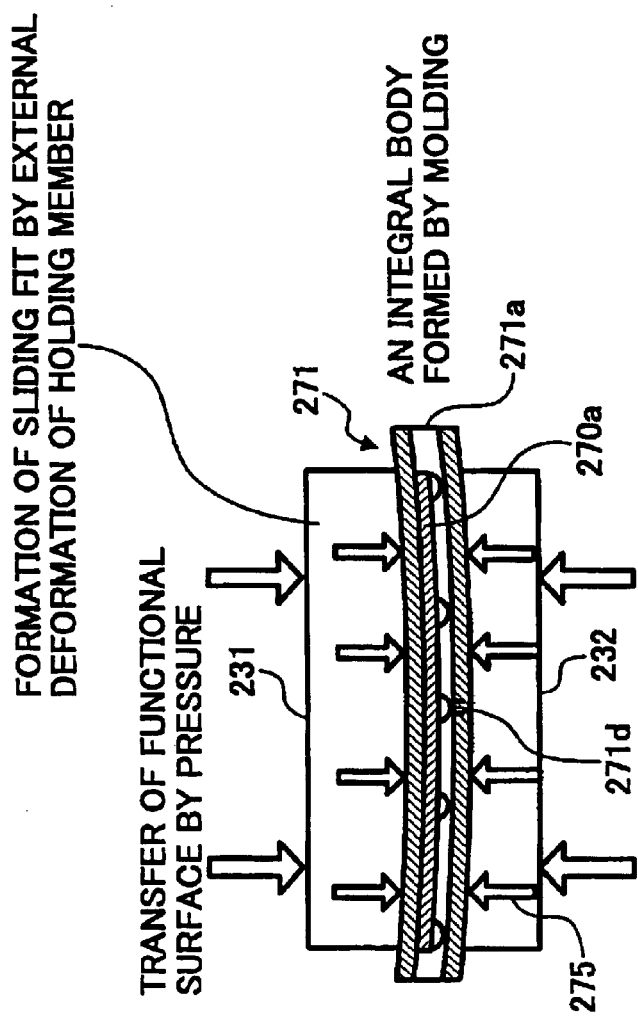
FIG. 26A is a front view representing the method for manufacturing a composite optical component according to the Embodiment 4 of the Third Invention.

FIG. 26 represents a manufacturing method according to the Embodiment 4. This manufacturing method is basically the same as that in Embodiment 1, except for the following two points 1) The holding member 271 is molded by stamping of sheet metal.

2) Reference positions of the holding member 271 and spare molded product (long-sized lens array) are fixed by bonding.

The following shows how to form the slide-fitted portion between the holding member 271 and a rib 270a of the spare molded product 270:

When the shape of the optical functional surface is transferred by applying pressure to the spare molded product 270 through the molding dies 231 and 232, pressure is applied in the vicinity of the holding part 271a of the holding member 271 and rib 270a from top and bottom by multiple pressure pin 275 to deform the holding part 271a and to tighten the rib 270a, thereby fixing it lightly.

Furthermore, the holding member 271 and spare molded product 270 are formed into a composite body by pressure molding. After that, with the composite optical component reversed upside down, a drop of bonding agent is dripped into a reference positioning hole 271d formed at the center in the longitudinal direction of the bottom side of the holding portion 271a of the holding member 271. The holding part 271a of the holding member 271 and the rib 270a of the spare molded product 270 are fixed in this one point(FIG. 27).

[Result]

Although the straightness of the spare molded product 270 of the long-sized lens array and the holding member 271 (molding material: 140 $\mu$m, holding member: 55 $\mu$m) was much greater than that of the composite optical component defined in the specifications (30 $\mu$m or less), the straightness of the optical function unit of the composite optical component is 28 $\mu$m.

Furthermore, the total cost of the composite optical component of the Embodiment 4 was reduced 50% as compared with that of the aforementioned Art for Comparison.

In this Embodiment 4, the holding member 271 and long-sized lens array (spare molded product) 270 were bonded at the reference position and were fixed in position. This provides a more reliable fixing at the reference position than that of Embodiments 1 to 3, and also ensures a stable maintenance of the optical functional device by the holding member 271, thereby providing a more precise composite optical component.

The above describes the Embodiments 1 to 4. In the composite optical component manufactured in each Embodiment, the optical functional device and holding member are designed as slidable except at the reference position. Its sliding resistance was 6N or less per millimeter in length, and was much smaller than $\mu F = a \times S \times E = 10.5$ [N]. Accordingly, at the time of thermal expansion and shrinkage, the optical functional device slides with respect to the holding member. So the internal distortion of the optical functional device caused by difference in thermal expansion between the optical functional device and holding member can be kept within the permissible limit. Thus, straightness is not deteriorated by the aforementioned thermal distortion, and hence deterioration in the optical function of the optical functional device does not occur.

Furthermore, the optical functional device and holding member are formed into a composite body by molding for creation of one integral body. So a composite body can be formed by using the spare molded product of an optical functional device and a holding member with a lower degree of straightness, This means that low cost production is achieved. The optical equipment and optical apparatus made of the optical functional device according to the present invention characterized by a higher degree of function can be manufactured at a lower cost than before.

The present invention is effectively applied especially to a composite optical component where severe straightness is essential according to specification requirements, for example, to a long-sized composite optical component.

Accordingly, the present invention can be effectively applied to an optical long-sized element where a severe straightness and surface precision is required by specifications, especially a long-sized composite optical component based on a lens array and the like. It is very effective to achieve a lower-cost production of higher-function product, for example, an optical writing unit and optical reading unit based on an optical device array such as a lens array and the like, as well as an image forming apparatus such as a printer using them and an image reading apparatus such as a scanner.

When the optical functional device and holding member are formed into a composite body by heating them and applying pressure to them with a mold, it is sufficient if transfer of the functional surface and formation of a slide-fitted portion can be performed. Although surface transfer and slide-fitted portion formation need not always be performed at the same time, they are preferred to be performed simultaneously from the view point of reducing the cost.

Regarding a composite optical component, the present invention can be applied to the cylindrical single lens and tabular two-dimensional lens array, similarly to the aforementioned Embodiments. As an optical functional device, furthermore, a high-precision optical component including a mirror and prism can be manufactured in the similar manner.

Further, the material of the optical functional device of a composite optical component requires reinforcement by the holding member. If the material of a holding member can hold and reinforce the optical functional device, it can be used according to the present invention, independently of any combination of such materials.

What is claimed is:

1. A method for manufacturing a composite optical component comprising: steps of holding an elongated, thin-walled functional device by a holding member to be formed into a composite body; and sandwiching said functional device by said holding member to form said composite body, wherein said functional device remains straight in changing environmental temperatures.

2. A method for manufacturing a composite optical component according to claim 1 wherein said functional device is an optical device wherein one or more lenses, prisms or mirrors are arranged.

3. A method for manufacturing a composite optical component according to claim 1, wherein the holding member is made of a rigid material.

4. A method for manufacturing a composite optical component according to claim 3, wherein the holding member is made of metal.

5. A method for manufacturing a composite optical component according to claim 1, wherein the holding member is a one-piece member.

6. A method for manufacturing a composite optical component comprising: steps of holding a functional device by a holding member to be formed into a composite body; and caulking said functional device by said holding member to form said composite body.

7. A method for manufacturing a composite optical component comprising: steps of holding a functional device by a holding member to be formed into a composite body; sandwiching said functional device by said holding member; and plastic-deforming said functional device to form said composite body.

8. A method for manufacturing a composite optical component comprising: steps of holding a functional device by a holding member to be formed into a composite body; caulking said functional device by said holding member; and plastic-deforming said functional device to form said composite body.

9. A method for manufacturing a composite optical component comprising: steps of holding a functional device by a holding member to be formed into a composite body; press-fitting said functional device into said holding member; and plastic-deforming said functional device to form said composite body.

10. A method for manufacturing a composite optical component comprising: steps of holding a functional device by a holding member to be formed into a composite body; elastic-deforming said holding member or functional device to fix said holding member and functional device together, heating said functional device; and plastic-deforming to reduce stress between two components, thereby allowing said holding member and functional device to slide-fit with each other.

11. A method for manufacturing a composite optical component according to claim 10 comprising elastic-deforming said holding member to sandwich said functional device.

12. A method for manufacturing a composite optical component according to claim 10 comprising elastic-deforming said holding member and caulking said functional device.

13. A method for manufacturing a composite optical component according to claim 10 comprising elastic-deforming said functional device and press-fitting said functional device into said holding member.

14. A method for manufacturing a composite optical component comprising carrying out the step steps of claim 10 and transfer of the shape of a molding die functional surface in the same process.

15. A method for manufacturing a composite optical component comprising the steps of:

holding a functional device by a holding member to be formed into a composite body;

sandwiching said functional device by said holding member to form said composite body; and forming in a rugged shape a part of said functional device assembled with said holding member.

16. A method for manufacturing a composite optical component comprising the steps of:

holding a functional device by a holding member to be formed into a composite body;

sandwiching said functional device by said holding member to form said composite body; and disposing a part of said functional device assembled with said holding member in a symmetrical configuration.

* * * * *